United States Patent [19]
Tippetts

[11] Patent Number: 4,467,984
[45] Date of Patent: Aug. 28, 1984

[54] ANGULAR RATE SENSING APPARATUS AND METHODS

[75] Inventor: Thomas B. Tippetts, Mesa, Ariz.

[73] Assignee: The Garrett Corporation, Los Angeles, Calif.

[21] Appl. No.: 206,195

[22] Filed: Nov. 12, 1980

[51] Int. Cl.$^3$ .................. B64C 13/16; F15C 1/06; F15C 1/04; F15C 3/00
[52] U.S. Cl. ........................... 244/78; 73/515; 137/825; 137/829; 137/833; 137/814
[58] Field of Search .............. 244/76 R, 78, 3.15, 244/3.21; 73/505, 515, 516; 417/18; 91/3, 364, 388; 137/14, 814, 825, 826, 829, 833

[56] References Cited
U.S. PATENT DOCUMENTS

| | | |
|---|---|---|
| 3,205,715 | 9/1965 | Meek . |
| 3,246,863 | 4/1966 | Posingies . |
| 3,310,985 | 3/1967 | Belsterling et al. . |
| 3,398,759 | 8/1968 | Rose ................................. 137/814 |
| 3,430,895 | 3/1969 | Campagnuolo . |
| 3,500,690 | 3/1970 | Schuemann . |
| 3,500,691 | 3/1970 | Moore . |
| 3,513,710 | 5/1970 | Bates et al. . |
| 3,521,655 | 7/1970 | Glaze . |
| 3,575,187 | 4/1971 | Sutton . |
| 3,590,289 | 6/1971 | Ostwald . |
| 3,621,861 | 11/1971 | Bowles ............................. 137/825 |
| 3,626,765 | 12/1971 | Moore et al. . |
| 3,741,018 | 6/1973 | Katz et al. . |
| 3,774,644 | 11/1973 | Leutner et al. . |
| 3,789,935 | 2/1974 | Saadeh . |
| 3,934,603 | 1/1976 | Avery ............................... 137/829 |
| 3,965,918 | 6/1976 | Finkbeiner et al. . |
| 3,971,257 | 7/1976 | Dryewiecki . |
| 4,007,625 | 2/1977 | Houben . |
| 4,241,760 | 12/1980 | Mon ................................. 137/829 |
| 4,256,015 | 3/1981 | Tippetts et al. . |

OTHER PUBLICATIONS

Drzewiecki, T. M., and Manion, F. M., "Fluerics 40: LJARS, The Laminar Jet Angular Rate Sensor," HDL-TM-79-7, Dec. 1979.

Manion, F. M., and Drzewiecki, T. M., "Analytical Design of Laminar Proportioal Amplifiers," Proceedings of HDL Flueric State of the Art Symposium I, Harry Diamond Laboratories, Oct., 1974.

Abbott, C. L., Tippetts, T. M., Tenney, S. M., and Paras, C., "A Study of Fluidic Gun Stabilization Systems for Combat Vehicles: Final Report," HDL-CR-8-0-100-1, Apr., 1980.

Rankin, T. M., Moore, A. G., and Schuemann, W. C., "Fluidic Angular Rate Sensor, A Replacement for Rate Gyroscopes?" John Hopkins Applied Physics Laboratory Technical Digest, Mar.–Apr., 1969.

Hewes, D., "The Design, Construction, and Operation of Airguide I and Airguide II Electrofluidics Autopilot Systems for Homebuilt Aircraft," Aug. 10, 1979.

Garner, H. D., and Poole, H. E., "Development and Flight Tests of a Gyro-Less Wing Leveler and Directional Autopilot," NASA-TN-D-7460, Apr., 1974.

*Primary Examiner*—Trygve M. Blix
*Assistant Examiner*—Rodney Corl
*Attorney, Agent, or Firm*—J. Richard Konneker; Albert J. Miller

[57] ABSTRACT

A three-axis navigational guidance system utilizes three specially designed internal jet-type fluidic angular rate sensors which simultaneously sense the rotational rate of a guided body relative to three mutually perpendicular control axes. Fluidic output signals from the sensors are converted to electrical signals which are used to maintain the body in a preselected attitude relative to each of the three axes. The sensors are rendered extremely accurate by means of unique calibration mechanisms associated therewith which compensate for or correct for fabricational inaccuracies in the sensors. The operation of the rate sensing portion of the guidance system is environmentally stabilized by a novel jet-control system which automatically maintains the Reynolds number of each sensor jet within a predetermined range to thereby substantially eliminate jet drift.

80 Claims, 18 Drawing Figures

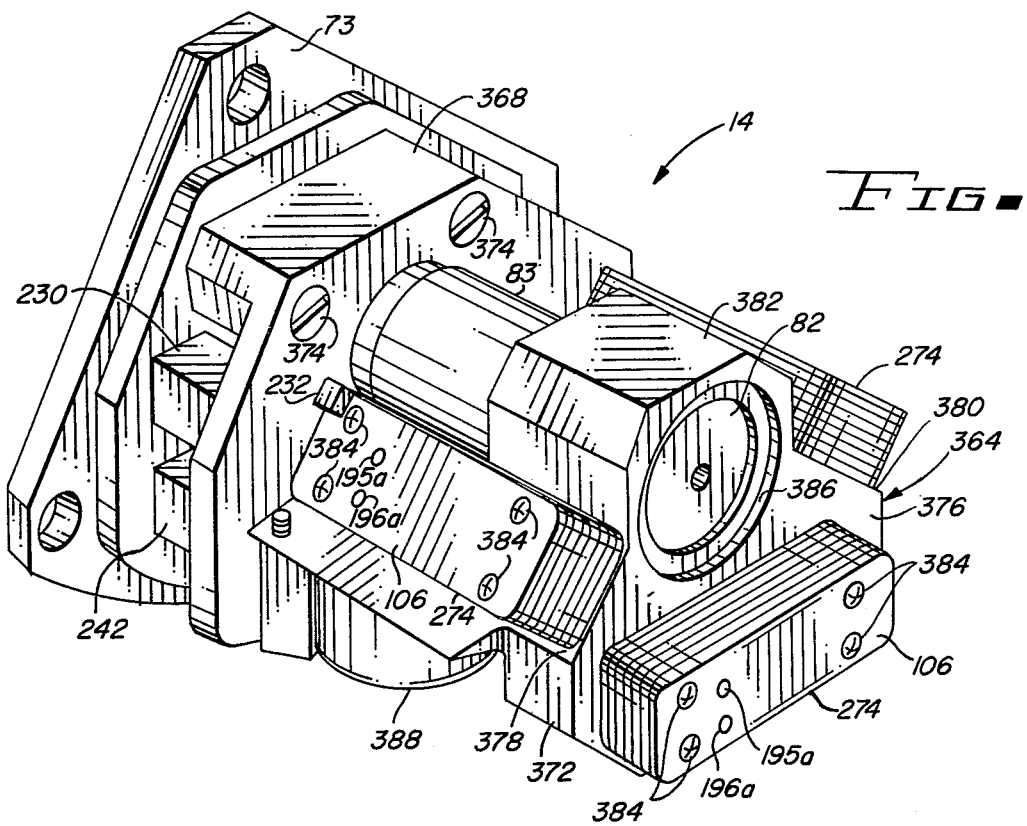
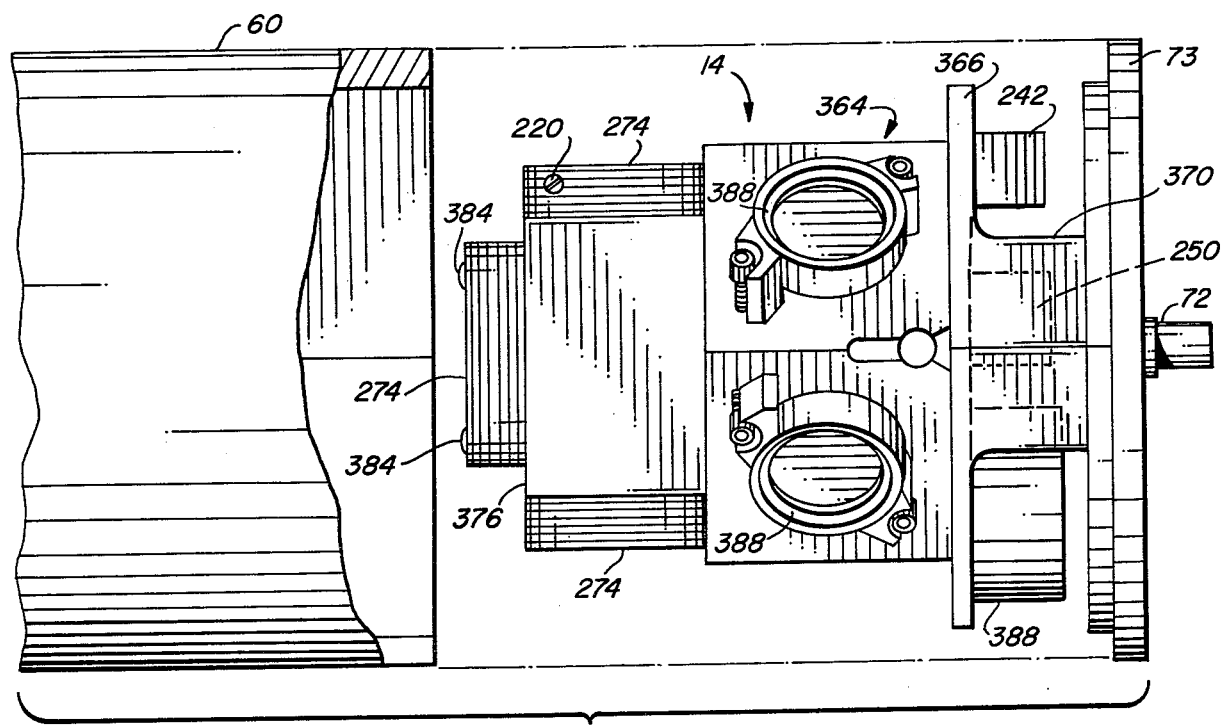

ANGULAR RATE SENSING APPARATUS AND METHODS

The Government has rights in this invention pursuant to Contract No. N00019-78-G-0288, WY 18, awarded by the U.S. Navy.

CROSS-REFERENCE TO RELATED APPLICATION

This application discloses subject matter common to that disclosed in my copending patent application Ser. No. 206,199 entitled "Pressure-to-Electric Output System for an Angular Rate Sensor or the Like" filed concurrently herewith.

BACKGROUND OF THE INVENTION

The present invention relates generally to rate sensing devices and systems, and more particularly to a novel electrofluidic angular rate sensing system, and associated apparatus and methods.

Various attempts have previously been made to design and build a fluidic replacement for the mechanical rate gyroscope long used as the primary attitude sensing element of conventional navigational guidance systems for ships, planes, guided missiles and the like. The most common approach has been to employ a device known as the fluidic angular rate sensor.

Such device basically comprises a body in which a chamber is formed. Pressurized air is forced through a nozzle passage within the body to form a jet which traverses the chamber. Spaced apart from the exit of the nozzle passage, and positioned directly in the path of the jet is a splitter designed to divide the jet into two separate and equal streams when the sensor body is at rest. As the sensor experiences rotation about a control axis (of the ship, plane, missile or the like) perpendicular to the axis of the nozzle passage, the splitter unequally divides the jet in a proportion representative of the rate and sense of such rotation. This unequal jet division during rotation about the control axis results from a relative offset between the splitter and jet caused by the Coriolis effect.

Each of the unequal streams flows into a different one of a pair of receiving passages positioned on opposite sides of the splitter within the body. The streams cause a pressure (or flow rate) differential between the receiving passages which is indicative of the rate and sense of the body's rotation about its control axis. Such pressure or flow differential may thus at least theoretically be used to generate and transmit corrective input signals to other components of the guidance system to thereby return the ship, plane, missile or the like to the correct attitude relative to the control axis.

Heretofore the fluidic replacement of the rate gyroscope, and navigational rate sensing systems utilizing it, has been hindered by a variety of structural and functional problems associated with conventional fluidic angular rate sensors. For example, unavoidable fabricational inaccuracies in such devices have prevented them from obtaining the extreme accuracy needed to replace the gyroscope. More specifically, despite the use of modern precision manufacturing techniques, certain internal asymmetries and misalignments remain which result in unequal division (or "offset") of the jet at zero rotational rate of the sensor about its control axis. This offset, of course, introduces a continuing source of output error into the operation of the sensor.

Greatly aggravating the jet offset problem is the environmental sensitivity of conventional fluidic rate sensors. Changes in the environment to which the conventional sensor is exposed cause its jet to variably drift relative to the splitter, thereby adding another source of unacceptable sensor output error.

Another equally vexing problem has been that of obtaining a useful (i.e., sufficiently powerful, accurate and responsive) output signal from the conventional fluidic rate sensor. It is desirable to convert the initial fluidic outputs of the sensor to electrical signal outputs in order to conveniently integrate the sensor with the electrical control surfaces of the guidance system (e.g., the autopilot system of an airplane). In addition to being unacceptably inaccurate because of the above-mentioned offset and drift problems, such initial fluidic outputs are quite weak. Thus, great difficulties have been encountered in using them to drive pressure-to-electric transducing devices to obtain electrical output signals. Attempts to utilize hot wire anemometer circuitry, wherein sensing wires are placed in each of the sensor receiving passages to monitor the varying flow rate differentials therebetween, have proven equally unsuccessful due to unacceptably high response times involved in differentially cooling such sensing wires.

SUMMARY OF THE INVENTION

Accordingly, it is the general object of the present invention to provide an electrofluidic rate sensing system and methods, utilizing an improved fluidic angular rate sensor, having the capability of replacing conventional rate sensing systems employing the mechanical rate gyroscope.

A more specific object of this invention is to provide a fluidic angular rate sensor, and associated methods, adapted to replace the rate gyroscope, the sensor having associated therewith calibration means for substantially eliminating the jet offset and drift problems which have been discovered to be associated with conventional fluidic angular rate sensors.

A further object of the invention is to provide an improved output system capable of converting the fluidic outputs of the rate sensor to an electrical output signal without introducing significant output error by such conversion.

These and other objects and advantages of the present invention are specifically set forth in or will become apparent from the following detailed description of preferred embodiments of the invention when read in conjunction with the accompanying drawings.

BRIEF DESCRIPTION OF THE DRAWINGS

FIG. 17 is a perspective view of the assemblied rate sensing system with its enclosing canister body removed; and FIG. 18 is a bottom view of the rate sensing system of FIG. 17 showing a portion of the removed canister body.

DETAILED DESCRIPTION

Introduction

Figure 1:
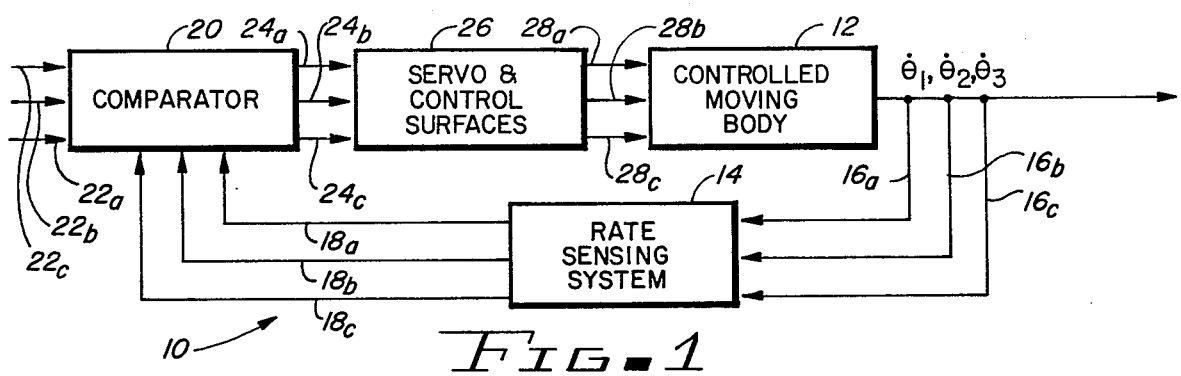
FIG. 1 is a schematic block diagram illustrating a navigational guidance system employing principles of the present invention.

Schematically illustrated in FIG. 1 is a navigational control or guidance system 10 used to maintain a moving body 12 such as a missile, airplane, ship or the like in a desired rotational attitude relative to three predetermined, mutually perpendicular control axes—for example, the roll, pitch and yaw axes of an airplane. The body's rotational rates of attitudinal deviation $\dot{\theta}_1, \dot{\theta}_2, \dot{\theta}_3$ about the three control axes are monitored by a rate sensing system 14 of the present invention which receives input signals 16a, 16b, 16c corresponding respectively to the rotational rates $\dot{\theta}_1, \dot{\theta}_2, \dot{\theta}_3$ of the moving body. Electrical output signals 18a, 18b, 18c, respectively indicative of the actual angular deviation rates $\dot{\theta}_1, \dot{\theta}_2, \dot{\theta}_3$, are sent from the rate sensing system to a comparator 20 (of conventional construction). The comparator compares the output signals 18a, 18b, 18c to reference input signals 22a, 22b, 22c, also sent to the comparator, which are indicative of the desired $\dot{\theta}_1, \dot{\theta}_2, \dot{\theta}_3$ (each such desired rotational rate usually being zero).

Upon sensing differentials between the signal sets 18a and 22a, 18b and 22b, 18c and 22c, comparator 20 relays appropriate control signals 24a, 24b, 24c to the body's servo and control surfaces 26. In turn, the servo and control surfaces (for example, the autopilot system of an airplane) causes corrective forces 28a, 28b, 28c to be exerted upon the moving body 12 to return it to its proper rotational attitude relative to each of the three control axes.

For many years, conventional rate sensing systems have employed mechanical gyroscopes, physically coupled to the moving body, as the primary rate sensing elements for each of the three control axes. In such conventional three-axis rate sensing systems, each of the three gyroscopes is basically a high speed rotating means which is rotationally motor-driven about a spin axis perpendicular to the body control axis with which the gyroscope is associated. Rotation of the gyroscope about its control axis (caused by undesired rotation of the moving body about the same control axis) causes the gyroscope to precess—i.e., rotate about a third axis perpendicular to its spin and control axis—in a sense and at a rate reflecting the sense and rate of the controlled body's rotational attitude deviation about the control axis. This precessional movement of the gyroscope is mechanically transmitted to a transducing device, such as a potentiometer, which in turn sends an electrical control signal to the overall guidance system of which the gyroscope is a part.

Despite their universal acceptance and use, rate sensing systems employing mechanical rate gyroscopes have certain unavoidable problems. For example, such systems are extremely sensitive to the environment to which they are exposed. Changes in temperature, pressure and humidity, for example, adversely affect the accuracy of the gyroscopic system. Additionally, the moving mechanical components of the system are quite delicate and of only marginal reliability when subjected to the high shock and vibration environment of, for example, guided missile applications. Also, because of the precision with which the gyroscopes and their associated hardware must be fabricated, gyroscopic rate sensing systems have become highly expensive to manufacture and maintain. Finally, the time required for a gyroscope rotor to obtain its steady-state speed has been proven undesirable in some of the more sophisticated applications.

Because of these and other problems, various attempts have previously been made to replace the gyroscopic rate sensing system with a fluidic system built around a device known as the fluidic angular rate sensor. These attempts have not met with great success due to a variety of structural and operational deficiencies heretofore associated with the device itself and the rate sensing system based thereon.

The rate sensing system 14 of the present invention uniquely eliminates or minimizes all of these deficiencies and, for the first time, provides a viable fluidic replacement for both the gyroscope and the gyroscopic rate sensing system.

Before describing the novel apparatus and methods of the present invention, however, the basic structure and operation of a representative conventional fluidic angular rate sensor will be briefly described with reference to FIG. 2 in which the sensor is diagrammatically depicted in greatly simplified form for illustrative purposes. Such conventional sensor, indicated generally at 30, is similar to that shown in U.S. Pat. No. 3,971,257 and includes a body 32 in which is formed a central internal chamber 34. Communicating with and extending rearwardly (i.e., to the left in FIG. 2) from the chamber 34 is an internal nozzle passage 36 having a flow axis 38 and an exit end 40. The sensor body 32 is positioned relative to a control axis 42 so that the nozzle axis 38 is perpendicular to the control axis (about which rotation is to be sensed). During operation of the sensor 30, a pressurized fluid, such as air, is forced forwardly through the nozzle passage 36, out the nozzle exit end 40, and forwardly across the chamber 34 in the form of a jet 44.

At the forward end of the chamber 34, the jet 44 impinges upon the sharp leading edge 46 of a generally wedge-shaped internal splitter portion 48 of the sensor body 32. The leading splitter edge 46 is generally aligned with the nozzle flow axis 38 and, in the absence of rotation of the sensor body about the control axis 42, is designed to evenly divide the jet 44 into two equal streams $S_1$, $S_2$. Stream $S_1$ is diverted by the splitter member 48 into a receiving passage 50 formed within the sensor body on one side of the splitter member 48, and stream $S_2$ is diverted into a second receiving passage 52 also formed within the sensor body and symmetrically positioned on the other side of the splitter member 48.

In the absence of angular rotation of the sensor body 32 about the control axis 42, the pressures within the receiving passages 50, 52 are theoretically equal.

Figure 2:
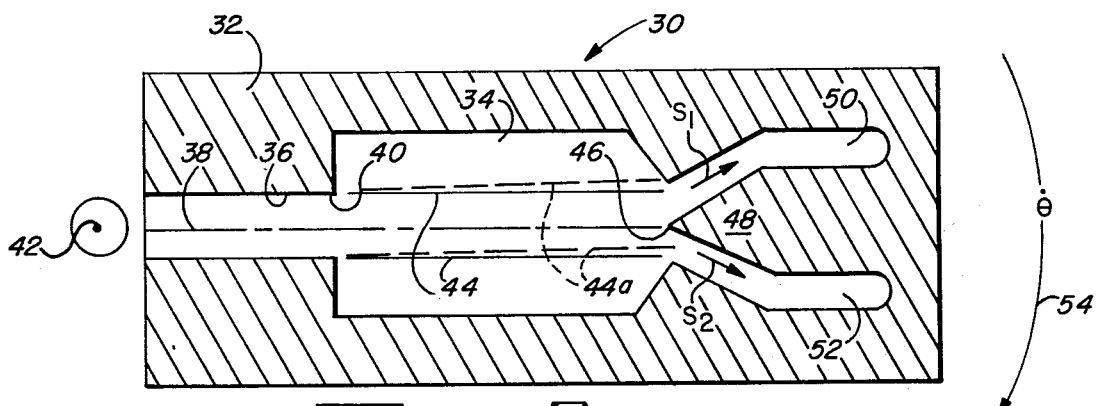
FIG. 2 is a simplified cross-sectional view taken through a conventional fluidic angular rate sensor.

However, when the sensor body 32 experiences rotation about the control axis 42 (for example in the clockwise direction indicated by the arrow 54) the Coriolis effect causes an upward shift of the jet 44 relative to the splitter edge 46 as indicated by the dashed line jet envelope 44a in FIG. 2. This relative shift between the jet and the splitter edge is due to the fact that as each particle of the jet fluid travels between the rotating nozzle exit 40 and the concurrently rotating splitter edge 46, the particle will follow a straight line in inertial space. During the time required for such particle to travel from the nozzle exit to the splitter edge, the splitter edge moves downwardly relative to the particle's constant line of motion. The magnitude of the distance that the splitter edge moves during the particle's travel time is dependent upon both the rate of rotation of the sensor body and the velocity of the particle.

The relative splitter edge shift caused by the Coriolis effect in turn causes an unequal division of the jet 44 by the splitter edge such that the stream $S_1$ is larger than the stream $S_2$. The result is that the pressure in receiving passage 50 is greater than the pressure in receiving passage 52.

It is thus possible to measure the resulting pressure differential in the passages 50, 52 and correlate such pressure differential to the rotational rate $\dot{\theta}$ imposed upon the sensor 30. This correlation technique was first propounded as early as 1942 (INSTRUMENTS, Vol. 15, September, 1942, at page 345) and has since been implemented in various fluidic angular rate sensors. Alternatively, by extending receiving passages 50, 52 outwardly through the sensor body 32, so that streams $S_1$, $S_2$ flow through such extended passages, the flow rate differential between streams $S_1$, $S_2$ may be used for such correlation as shown in U.S. Pat. No. 3,205,715.

However, the practical harnessing of the Coriolis effect in the accuracy and response ranges required to fluidically replace the navigational gyroscope has, until the present invention, proven to be an elusive goal despite numerous attempts to achieve it.

In accord with the present invention, part of the reason for past failures to fluidically replace the gyroscope has been found to be the adverse effect upon the conventional fluidic rate sensor's performance caused by even minute manufacturing inaccuracies in the nozzle and splitter portions thereof—inaccuracies which to date have proven to be unavoidable despite the employment of modern precision fabrication techniques. Specifically, even an extremely small offset between the splitter edge 46 and the nozzle axis 38 causes a false pressure differential between the receiving passages 50, 52. Aggravating this misalignment problem is that the slightest degree of asymmetry at the nozzle exit 40 causes the axis of the jet 44 to shift relative to the nozzle flow axis 38. Such asymmetry also causes a false pressure (or flow) differential between the receiving passages 50, 52 at zero angular velocity of the sensor as well as during rotation thereof.

Moreover, in the accuracy range required for a navigational rate sensing device, devices such as the conventional angular rate sensor 30 have proven to be highly environmentally sensitive. More specifically, changes in the environment to which the jet 44 is exposed cause its axis to "drift" relative to the nozzle flow axis 38, thus introducing another source of inaccuracy into the operation of the sensor 30.

Finally, there have been acute problems in obtaining a sufficiently accurate electrical output signal from conventional fluidic sensors. One approach to achieving useful electrical output signals has been to use the receiving passages 50, 52 as flow passages for the streams $S_1$, $S_2$, as previously described, and to insert in each of the flow passages a sensor wire portion of a hot wire anemometer circuit as disclosed in U.S. Pat. No. 3,205,715. As the jet is deflected by sensor rotation, the resulting flow differential between the two streams cools one of the sensing wires faster than the other one, causing a voltage drop across the anemometer circuit. However, the high response time involved in differentially cooling the two sensing wires, coupled with the above-described sensor asymmetry and misalignment problems, renders such an approach unsatisfactory for most navigational applications.

Another approach, suggested in U.S. Pat. No. 3,971,257, has been to use the pressure differential between the receiving passages 50, 52 to directly drive analog type pressure-electric transducers (for example, piezoelectric transducers). However, the rotational induced pressure differential, even at maximum jet deflection, is quite small and is well below that needed to obtain sufficient navigational accuracy out of such transducing devices. Additionally, because of the built-in inaccuracy problems of conventional fluidic rate sensors, attempts to interpose pressure amplification devices between the sensor and a transducer would simply magnify the inherent sensor error, passing it through to the ultimate electric control signals.

The present invention successfully overcomes all of the above problems and limitations, and provides a three-axis electrofluidic navigational angular rate sensing system (the system 14 in FIG. 1) utilizing three uniquely designed, extremely accurate fluidic angular rate sensors. The great accuracy and broad range of the new sensing system (for each of its control axes) is depicted in the graph of FIG. 3 in which the accuracy (curve 54) and band width (curve 56) of each of its rate sensors are plotted against the sensor's jet length.

Figure 3:
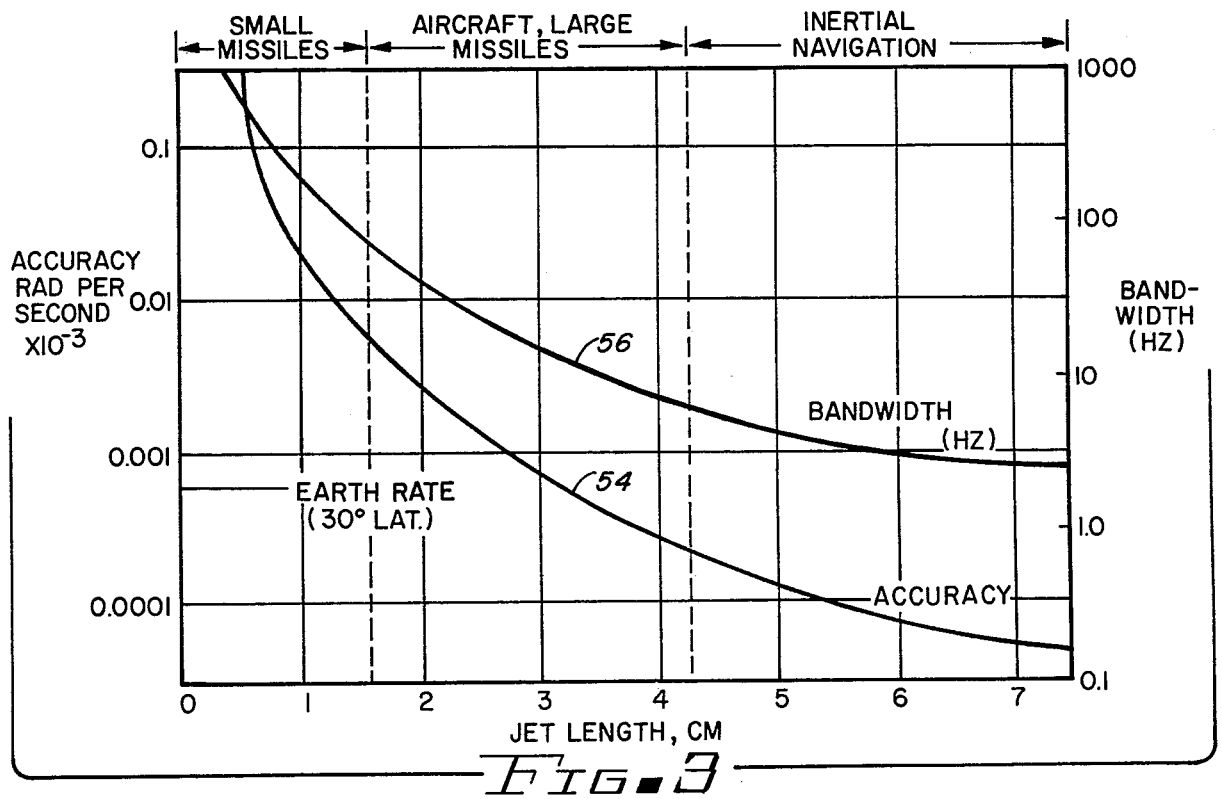
FIG. 3 is a graph illustrating the performance of the electrofluidic rate sensing system portion of the guidance system depicted in FIG. 1.

As can be seen in FIG. 3, the rate sensing system 14 has the capability of covering the entire navigational control spectrum from small guided missiles to extreme accuracy inertial navigation applications. For example, with a three centimeter jet length, (i.e., at a point only approximately midway along the accuracy curve), each of the rate sensors of the present invention is accurate enough to sense an angular velocity equal to that of the earth's rotation, yet has a band width of approximately 15 Hz.

The accuracy and response range illustrated in FIG. 3 can be, at best, only approximated by mechanical gyroscopic systems, and then only at great fabrication and maintenance costs. Additionally, the resulting gyroscopic system would be quite delicate and environmentally sensitive, rendering it structurally unsuited to many applications. To date, the performance spectrum of FIG. 3 has not even been approximated by conventional fluidic rate sensors.

Figure 4:
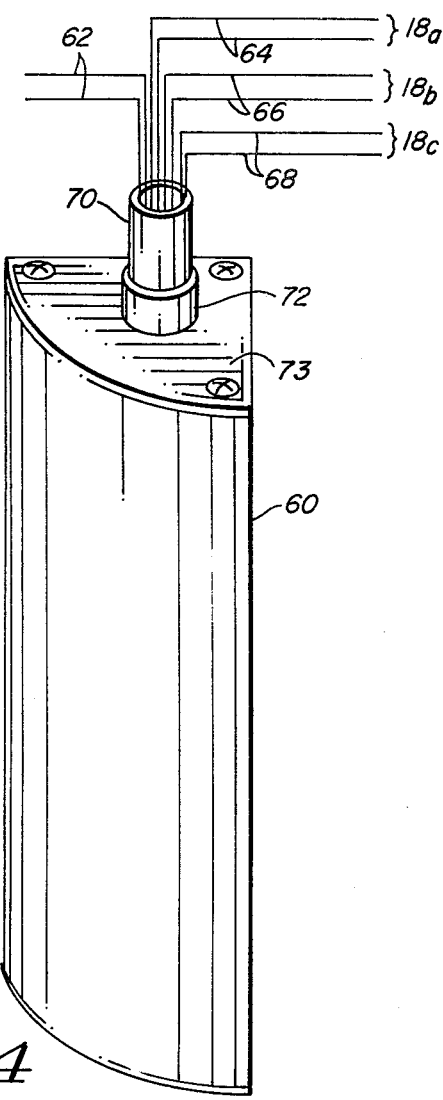
FIG. 4 is a perspective view of an airtight, thermally insulated canister in which the rate sensing system is housed.

As described below, all of the operating components of the rate sensing system are housed in a small, thermally insulated, airtight canister 60 (FIG. 4), which is easily mounted on the moving body whose rotational attitude is to be controlled. The canister 60 of FIG. 4 is of generally cylindrical shape and has a quarter-round cross-section. However, other canister shapes may be used depending upon the size and configuration of the mounting space available.

The system 14 is electrically driven by a pair of power leads 62, and respectively provides the three electrical output signals 18a, 18b, 18c of FIG. 1 via three pairs 64, 66, 68 of control leads. The power leads 62, and the control lead pairs 64, 66, and 68 are conveniently grouped in a single conduit 70 received by a pin-type receptacle 72 mounted on a removable end plate 73 of the canister 60.

Rate Sensing System 14

Figure 5:
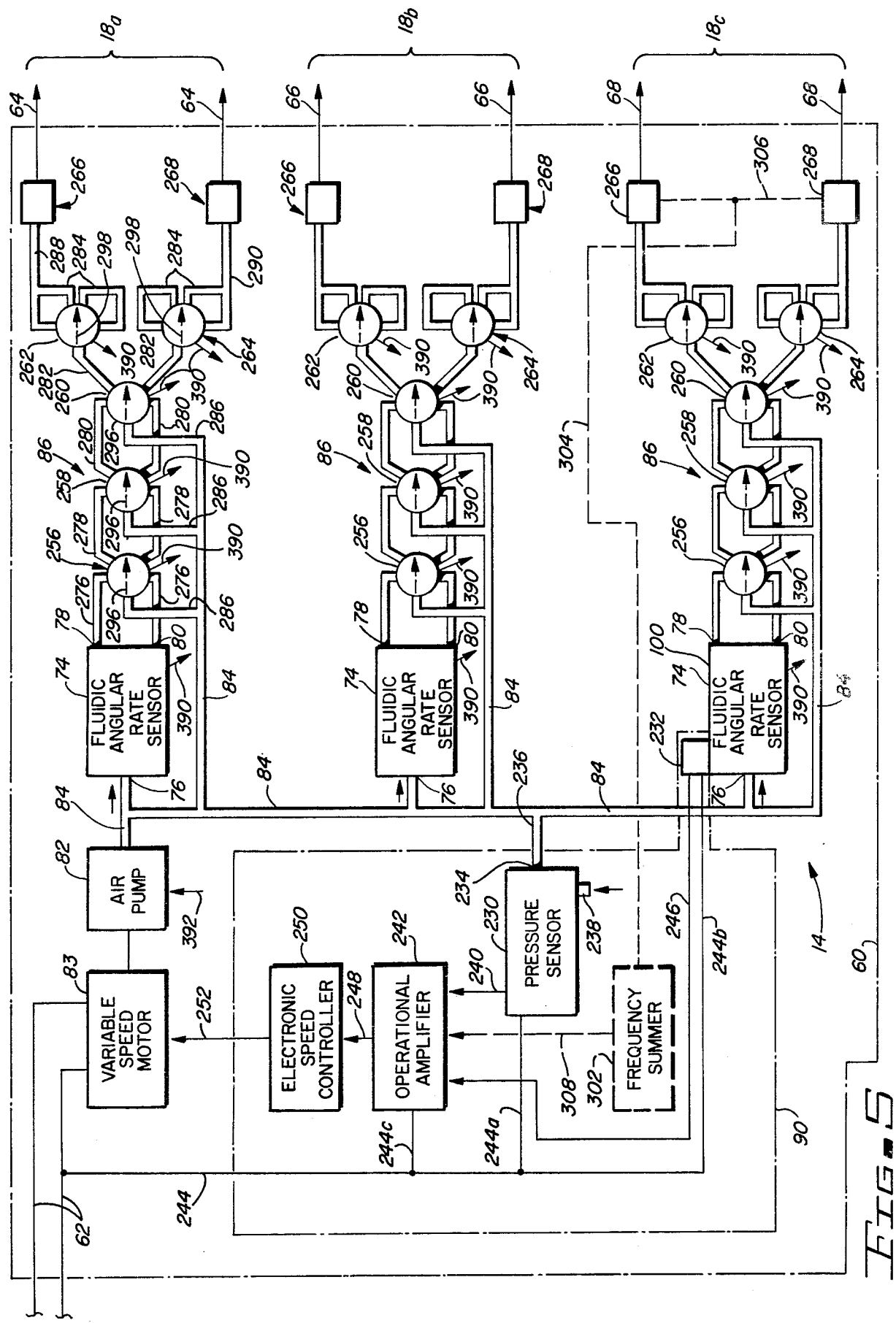
FIG. 5 is a schematic diagram of the rate sensing system.

The rate sensing system 14, shown diagrammatically in FIG. 5, is an electrofluidic system representing a preferred embodiment of the present invention. System 14, whose operating components are all compactly arranged within the canister 60 as subsequently described, utilizes three specially designed fluidic angular rate sensors 74, each of which serves as the angular rate sensing element for one of the three mutually perpendicular control axes of the guidance system 10. Except for important distinctions set forth below, each of the three rate sensors 74 functions in the same general manner as the previously described conventional fluidic rate sensor 30 (FIG. 2) and has an inlet passage 76 communicating with an internal nozzle passage, and a pair of outlet passages 78, 80, each communicating with one of its two internal stream-receiving passages. A pressurized fluid, such as air, is supplied to the inlet 76 of each sensor 74 by a variable volume pump 82, driven by a variable speed motor 83, through an air supply network 84 consisting of certain air passages later described.

The outlets 78, 80 of each sensor 74 are connected to one of three fluidic-to-electric transducing systems 86, each of which functions in an unique manner to amplify the receiving passage pressures of its sensor and convert them to a pair of oscillating electrical control signals. Each pair of such electrical control signals corresponds to one of the control signals 18a, 18b, 18c (FIG 1) and is sent to the comparator portion 20 of the guidance system 10 through one of the control lead pairs 64, 66, 68.

As will be seen, the rate sensors 74, and the fluidic-electric transducing or output systems 86, respectively, provide highly economical solutions to two of the major problems identified by the present invention as barring the long-needed fluidic replacement of the costly and delicate gyroscopic rate sensing system—namely, the alignment and asymmetry difficulties associated with conventional fluidic rate sensors, and the problem of obtaining sufficiently accurate and responsive output signals therefrom. The third major problem, that of controlling of eliminating the environmental sensitivity of conventional fluidic rate sensors in navigational applications, is solved by a unique flow control system 90 which senses and utilizes certain parameters of system 14 itself to stabilize the operation of the rate sensing system 14 and to assist in obtaining extreme accuracy therefrom.

Fluidic Angular Rate Sensor 74

Figure 6:
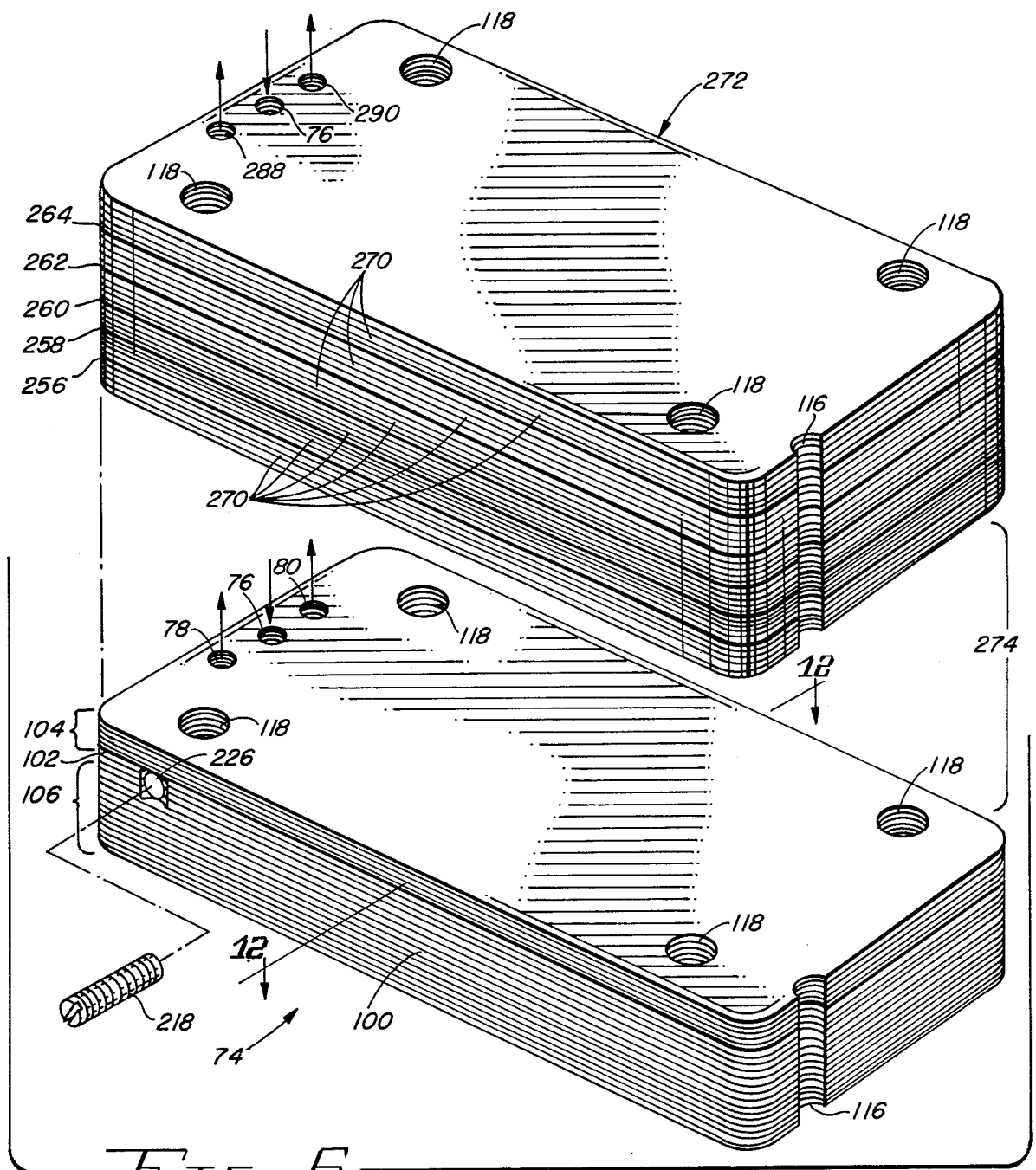
FIG. 6 is a partially exploded perspective view of a laminated rate sensor and output body of the present invention.

One of the angular rate sensors 74 of the rate sensing system 14 is shown in perspective in FIG. 6. Sensor 74 has an elongated rectangular monolithic body 100 defined by a number of thin metal laminae, each of which has a substantially identical elongated rectangular periphery, which are stacked in precise alignment and mutually bonded together or otherwise intersecured. Such laminae include a main rate sensor lamina 102 which is sandwiched between a series of auxiliary laminae 104 above it, and a series of auxiliary laminae 106 below it. The auxiliary laminae 104, 106 have various openings, channels and passages formed therein which cooperatively function to transfer air to and from the main lamina 102 for purposes described below. The rate sensor inlet passage 76 extends downwardly through the auxiliary laminae 104 adjacent their left ends and is fluidically connected to the main lamina 102 as described below. The rate sensor outlet passages 78, 80, which communicate with the main lamina 102 through appropriate body passages defined by openings etc. in the auxiliary laminae 104, exit the sensor body 100 through the uppermost lamina 104 adjacent the left end of the body 100.

Figure 7:
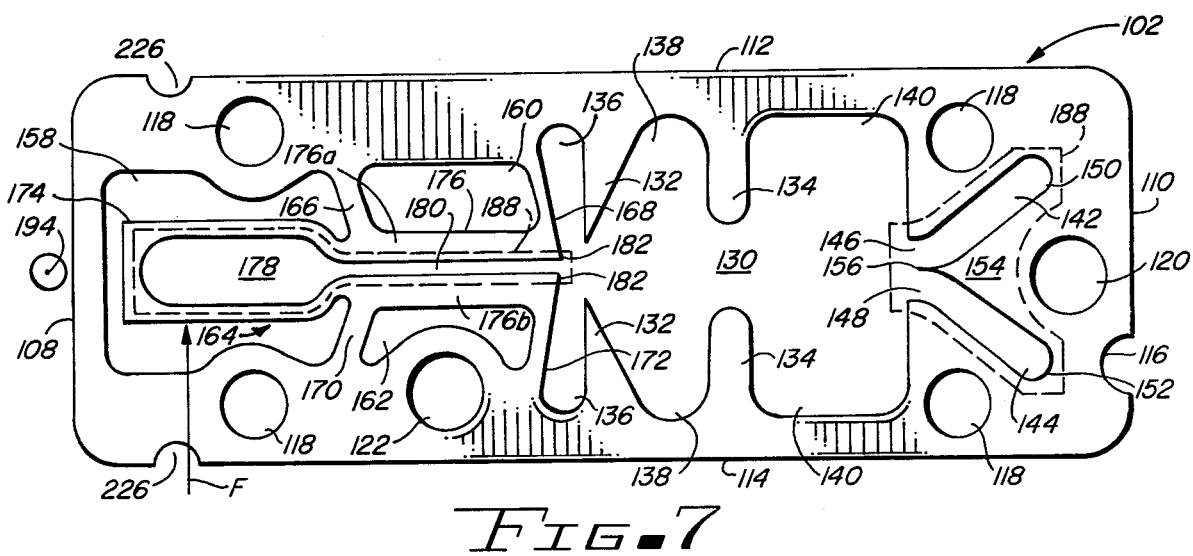
FIG. 7 is a top plan view of the main rate sensor lamina portion of the laminated body of FIG. 6.

Referring to FIG. 7, the elongated rectangular main rate sensor lamina 102 is slightly thicker than the auxiliary or air transfer laminae 104, 106 and has a pair of opposite end edges 108, 110, and a pair of opposite, longitudinally extending side edges 112, 114. An alignment notch 116 is formed in the right end edge 110 adjacent its juncture with the bottom side edge 114. Notch 116 is used in conjunction with similarly positioned alignment notches in the other laminae 104, 106 to afford a visual verification that all of the laminae in the body 100 are properly oriented prior to the bonding together of the laminae. To mount the sensor body 100 on a suitable support, four mounting holes 118 are formed through the main lamina 102 (and the auxiliary laminae) generally adjacent each of their four corners as indicated in FIGS. 6 and 7.

Additionally, circular openings 120 and 122 are formed through the main lamina 102. Opening 120, which is laterally centered and positioned closely adjacent the right end edge 110, defines a portion of the inlet passage 76 which supplies air to the main lamina 102 and other components of the rate sensing system 14 as subsequently described. Opening 122 is positioned slightly to the right of the lower left mounting opening 118 and functions as a portion of a transfer passage (not shown) within the sensor body 100 which communicates with the inlet passage 76 to transfer air to various other components of the rate sensing system.

A relatively large opening is formed through a longitudinally central portion of the main lamina 102 to define an interaction channel 130. The interaction channel opening is configured to define adjacent its left end an opposed pair of laterally inwardly directed and sharply pointed swirl attenuation vanes 132 whose inner ends are spaced slightly apart. Also defined by the interaction channel opening is a second opposed pair of laterally inwardly directed swirl attenuation vanes 134 positioned to the right of the vanes 132, the vanes 134 having rounded inner ends which are spaced slightly further apart than the inner ends of the vanes 132. The vanes 132, 134 in turn define an opposed pair of laterally outwardly extending channels 136 at the left end of the interaction channel 130, an opposed pair of laterally outwardly extending channels 138 positioned between the vanes 132, 134, and an opposed pair of laterally outwardly extending channels 140 positioned between the vanes 134 and the right end of the interaction channel 130.

A pair of receiving channels 142, 144 are formed through the lamina 102 near the right end 110 thereof, the receiving channels having inlet openings 146, 148 opening rearwardly (i.e., leftwardly) into the interaction channel 130, and closed outer ends 150, 152. From their inlet openings 146, 148 the receiving channels 142, 144 extend forwardly and diverge laterally outwardly, defining a generally wedge-shaped splitter member 154 having a sharp leading splitter edge 156 which separates the channel inlets 146, 148 and is laterally centered relative to the lamina 102.

Through a left end portion of the lamina 102, three openings 158, 160, 162 are formed. Opening 158 is generally U-shaped and is positioned directly adjacent the left lamina end 108, opening 160 is positioned between opening 158 and the upper laterally extending channel 136, and opening 162 is positioned between opening 158 and the lower laterally extending channel 136. Openings 158, 160, 162 define jet-forming means in the form of an elongated nozzle portion 164 of the lamina 102. Nozzle portion 164 extends longitudinally along a laterally central portion of the lamina 102 and is connected to the balance of lamina 102 by narrow support arms 166, 168 above the nozzle portion 164, and narrow support arms 170, 172 below it.

Nozzle 164 has an inlet section 174 at its left end, and a discharge section 176 at its right end. Discharge section 176 is approximately the same length as the inlet section 174, but is slightly narrower. The inner ends of support arms 166, 170 are positioned slightly forwardly of the juncture of the inlet and discharge sections 174, 176, and the inner ends of the support arms 168, 172 are positioned at the right end of the discharge section 176. Each of the support arms extends laterally outwardly at a slight rearward angle from its juncture with the nozzle discharge section 176.

An elongated nozzle inlet channel 178 is formed through the nozzle inlet section 174 and communicates with a much narrower nozzle discharge channel 180 entending lengthwise through the nozzle discharge section 176 and opening into the interaction channel 130 through an exit end 182 of nozzle discharge section 176. The nozzle discharge channel 180, which has a flow axis 184 (see FIG. 8, in which the main lamina 102 of FIG. 7 has been rotated 90° counterclockwise) that is substantially centered between the side edges 112, 114 of the lamina 102, divides the nozzle discharge section 176 lengthwise into two horizontally extending narrow wall members 176a, 176b spaced apart on opposite sides of the nozzle flow axis 184. Such opposite wall members 176a, 176b are respectively carried by the support arm pairs 166, 168 and 170, 172, and in turn carry the nozzle inlet portion 174.

For the most part, the various openings, passages, etc. just described are formed through the main sensor lamina 102 by a conventional chemical etching process to assure a high degree of constructional accuracy. However, the lamina areas within the dotted line envelopes 188 (in which are located the nozzle inlet and discharge passages 178, 180, the splitter edge 156, and the receiving channels or passages 142, 144) are formed by the electric discharge machining (EDM) process to yield an even higher degree of fabricational accuracy in the more critical lamina portions. While such EDM process is well known, and thus need not be described in detail herein, it consists generally of using a moving, electrically charged, very small-diameter wire as a cutting instrument to form the desired lamina surface configurations within the envelopes 188.

During operation of the sensor 74, air from the supply network 84 is forced into the sensor inlet passage 76 and downwardly therethrough into the nozzle receiving channel 178. Air entering the receiving channel 178 is forced outwardly through the nozzle discharge channel or passage 180 in the form of a fluid jet 190 (FIG. 8) which forwardly (i.e., upwardly in FIG. 8) traverses the interaction chamber 130 and impinges upon the leading splitter edge 156. The jet 190 passes successively between the inner ends of the guide vane pairs 132, 134 which function to prevent fluid recirculation back toward the nozzle exit. The outer ends of the opposite channels 136 are vented (by internal sensor body passages not shown) to a plenum (also not shown) in the sensor body to equalize the pressure in the channels 136, thus preventing fluid disturbance of the jet adjacent the nozzle exit.

The jet 190 (FIG. 8) has a jet axis 192 and, as previously generally described, is divided by the splitter member 154 into separate streams $S_1$, $S_2$. Streams $S_1$, $S_2$ have a cross-sectional area differential indicative of the rate and sense of the rotation of the sensor 74 about a control axis 194 perpendicular to its nozzle axis 184.

More specifically, the splitter edge 156 is designed to evenly divide the jet 190 (i.e., so that the streams $S_1$, $S_2$ have substantially equal cross-sectional areas) in the absence of such rotation of the sensor 74 about its control axis. A clockwise rotation of the sensor (about the control axis 194) will, because of the previously described Coriolis effect, cause the relative jet-splitter edge movement previously described and render the cross-sectional area of the stream $S_1$ larger than the cross-sectional area of the stream $S_2$.

Such unequal jet division (which constitutes one of the rate sensing system's input signals 16 shown in FIG. 1) creates a pressure differential in the receiving passages 142, 144. A fluidic output is produced from each of the receiving channels or passages 142, 144 by means of the sensor output passages 78, 80 which respectively communicate with the receiving passages 142, 144. These fluidic outputs may then be compared to determine the rate and sense of the sensor's rotation about the control axis 194 and ultimately used to create one of the rate sensing system's output signals 18 (FIG. 1).

Calibration of the Rate Sensor and Control of its Environmental Sensitivity

Even with the very precise construction method used to form the nozzle, splitter, and receiving passage portions of the main sensor lamina 102 (such splitter and receiving passage portions collectively defining a part of the jet-receiving means of the sensor), at least a slight degree of fabricational inaccuracy remains in those portions. As described previously, such inaccuracy manifests itself in two primary manners: (1) asymmetry of the nozzle discharge portion 176 (FIGS. 7 and 8), which causes undesired misalignment between the jet axis 192 and the nozzle discharge or flow axis 184 (FIG. 8), and (2) lateral misalignment or offset between the splitter edge 156 and the flow axis 184. As previously noted, these two structural inaccuracies combine to produce a false pressure differential at the sensor outlets at zero angular velocity of the sensor body 100 (as well as during rotation thereof) because of the continuing unequal division of the jet 190.

Figure 9:
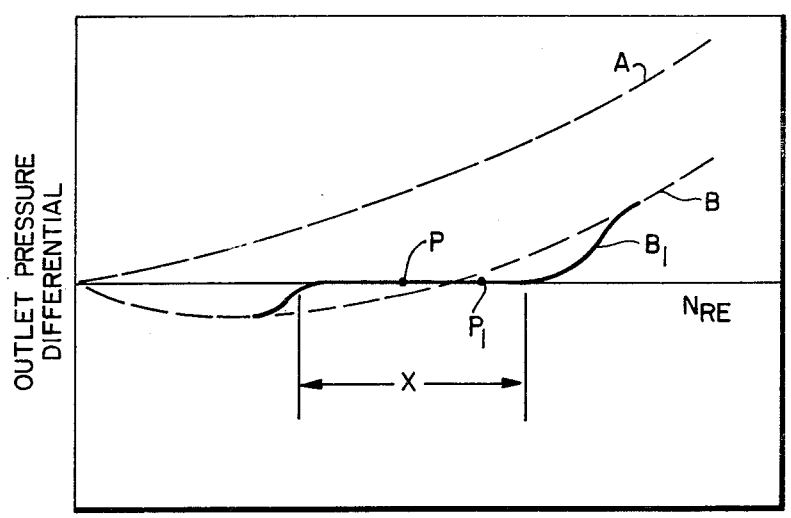
FIG. 9 is a graph illustrating the effect on sensor output pressures, at zero angular velocity, of certain calibration and stabilization steps of the present invention.

During development of the sensor 74, it was discovered and empirically demonstrated that the magnitude of this false pressure differential at the sensor outlets is functionally related to the Reynolds number ($N_{Re}$) of the jet 190 in a manner graphically depicted in FIG. 9, in which the outlet pressured differential (at zero rotational rate of the sensor body) is plotted against the Reynolds number of the jet 190. In FIG. 9, the monotonically increasing dashed line curve A represents this relationship when the main sensor lamina 102 (in place within the sensor body 100) is in its as-fabricated state—i.e., having both the nozzle asymmetry and the splitter edge offset inaccuracies.

The present invention provides a unique three-step calibration method for compensating for these structural inaccuracies in the lamina 102, and for eliminating the previously mentioned sideways "drift" of the jet 190 caused by environmentally-induced changes in certain of its flow parameters.

Figure 11:
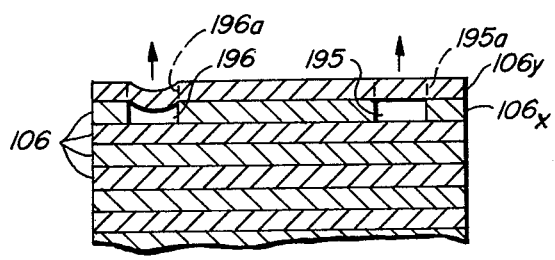
FIG. 11 is a slightly enlarged fragmentary cross-sectional view taken through the rate sensor body along line 11—11 of FIG. 10.
Figure 10:
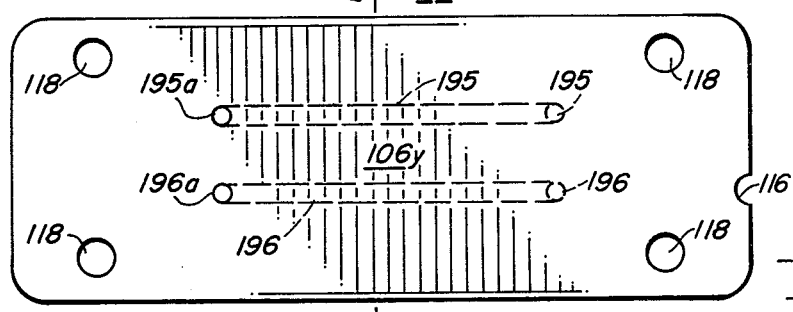
FIG. 10 is a reduced scale bottom view of the sensor and output body of FIG. 6.

The first step in such method is to adjustably increase the pressure in one of the receiving passages 142, 144 to compensate for the splitter edge offset by unequally venting the receiving passages. Referring to FIGS. 10 and 11, to accomplish this unequal venting, a pair of substantially identical vent passages 195, 196 (defined within the sensor body 100 by the lower auxiliary lamina 106) are respectively extended from the receiving passages 142, 144 outwardly through the bottom of the sensor body. Vent passage 195 communicates with the sensor outlet passage 78 and the receiving passage 144, and vent passage 196 communicates with the sensor outlet passage 80 and the receiving passage 142. From their junctures with the receiving passages the vent passages 195, 196 extend downwardly to the auxiliary lamina 106x immediately adjacent the lowermost auxiliary lamina 106y, leftwardly along the lamina 106x, and then outwardly through vent outlet openings 195a, 196a formed through the lowermost lamina 106y.

During calibration of the rate sensor 74 (with air being supplied through its internal nozzle) it is determined which of the outlet passages 78, 80 has the higher pressure, thus indicating which receiving passage has the higher pressure. As an example, if the splitter edge 156 is offset to the right in FIG. 8, receiving passage 142 and outlet passage 80 would have the higher pressure. The rate sensor outlet pressures are then equalized by progressively restricting the vent passage (i.e., vent passage 195) communicating with the lower pressure outlet passage 78 until the outlet passage pressures are equalized. In the above example, the adjustable restriction of the vent passage 195 is accomplished by progressively deforming a portion of the auxiliary lamina 106y inwardly into the vent passage 196, as illustrated in FIG. 11, to restrict the flow of air therethrough and thus elevate the pressure in receiving passage 144.

When this first step is accomplished, and the splitter edge misalignment thus compensated for, the relationship between the Reynolds number of the jet 190 and the outlet pressure differential becomes that represented in FIG. 9 by the dashed line curve B. Curve B is a nonmonotonically increasing curve which generally represents a downward pivoting of the original curve A, about its origin, through the zero pressure differential line. Curve B, which is obtained by the step of compensating for the splitter edge misalignment, thus represents the sensor outlet pressure "offset" (as a function of the jet's Reynolds number) still remaining, and which is caused by nozzle asymmetry.

Specifically, during development of the rate sensor 74, it was discovered that such asymmetry occurs primarily at the opposite corner surfaces 198 (FIG. 8) defined at the junctures of the front wall surfaces 182 of the nozzle discharge section 176 and the oppositely facing inner wall surfaces 200 of the wall members 176a, 176b thereof. These corner wall surfaces 198, although designed to define sharp edges at the exit end of the nozzle discharge passage 180, in actuality have an unavoidable degree of rounding and unequal curvature. Such slight rounding and unequal curvature of the corners 198 is shown in FIG. 8 in greatly enlarged and exaggerated form for purposes of illustration.

Because of this fabrication asymmetry associated with the exit corner surfaces 198, the jet 190 separates from the nozzle along these opposite corner surfaces at separation points 202, 204 theron which are mutually offset in a direction parallel to the nozzle flow axis 184. In FIG. 8 the jet separation point 202 (along the left nozzle corner surface 198) is shown offset rearwardly of (i.e., downwardly of) the opposite separation point 204 along the right nozzle exit corner surface 198. This illustrative relative separation point offset causes the jet axis 192 to deflect leftwardly of the nozzle flow axis 184. This, in turn, also tends to cause unequal division of the jet 190—even if the leading splitter edge 156 is precisely aligned with the nozzle axis 184.

The second step of the sensor calibration method of the present invention comprises compensating for this nozzle exit edge asymmetry and is accomplished generally by exerting a transverse force F (FIG. 7) on the inlet section 174 of the nozzle member 164 to thereby adjustably deform a predetermined portion of the rate sensor. Such force, which is generally perpendicular to the nozzle axis 184, slightly upwardly deflects the inlet portion 174. This upward deflection, in turn, causes a relative movement of the opposite nozzle wall members 176a, 176b in a direction parallel to the nozzle axis 184 as indicated by the arrows 206 in FIG. 8.

Figure 8:
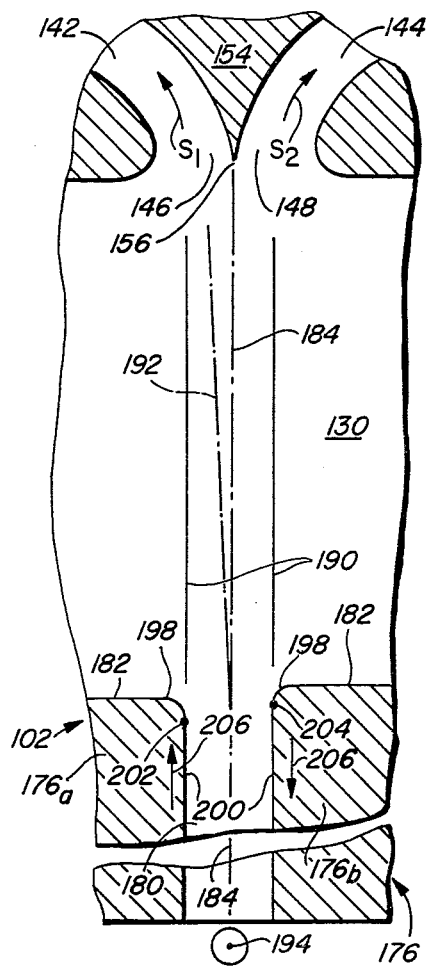
FIG. 8 is an enlarged, longitudinally compressed illustration of a generally central portion of the rate sensor lamina of FIG. 7.

More specifically, and with reference to FIGS. 7 and 8, such lateral deflection of the nozzle inlet section 174 forces the wall member 176a to move forwardly (i.e., to the right in FIG. 7 and upwardly in FIG. 8), forwardly flexing the members 166, 168 which support it, while simultaneously moving the opposite nozzle wall member 176b rearwardly and rearwardly flexing its support members 170, 172. Such relative adjustment of the wall members 176a, 178b causes a corresponding relative movement of the opposite corner edge surfaces 198 to bring the separation points 202, 204 into precise alignment. This, in turn, pivots the errant jet axis 192 (FIG. 8) rightwardly into precise alignment with the nozzle axis 184, thus correcting for the remaining jet-division inaccuracy of the sensor 74.

The selective exertion of the transverse adjusting force F (FIG. 7), which aligns the jet separation points 202, 204, (FIG. 8) is effected in the following manner. As can best be seen in FIGS. 12 and 13, several of the auxiliary laminae 104 (for example, the successively adjacent laminae 104a, 104b, 104c) positioned immediately above the main sensor lamina 102, and several of the auxiliary laminae 106 (for example, the successively adjacent laminae 106a, 106b, 106c) positioned immediately below it, are configured along their left end portions in a manner quite similar to the main lamina 102. More specifically, through each of these auxiliary laminae an opening 210 is formed which corresponds in shape and location to the U-shaped opening 158 adjacent the left end 108 of the main lamina 102. These U-shaped openings 210 define in each of the auxiliary laminae 104a, 104b, 104c, 106a, 106b, 106c an elongated portion 212 having a location and peripheral configuration substantially identical to the nozzle inlet section 174 of the main lamina 102. However, such portions 212 do not have formed therein openings similar to the nozzle inlet channel 178 of the main lamina 102. The only openings formed in such lamina portions 212 are aligned openings 76 formed through the portions 212 of the laminae 106a, 106b, 106c which define an inner portion of the sensor inlet passage 76 which delivers air downwardly into the nozzle inlet passage 178 as previously described.

When the aligned sensor laminae are mutually bonded together to form the monolithic sensor body, the lamina portions 212 above and below the nozzle inlet portion 174 define therewith a nozzle adjustment substructure 214 (FIG. 12) within the sensor body. It is upon this substructure 214 that the transverse nozzle adjusting force F is exerted. To permit transverse movement of the substructure 214 (and thus the nozzle inlet portion 174) the upper and lower surfaces of the substructure 214 are coated with a bonding agent inhibitor prior to the lamina bonding process. The application of the inibitor prevents the bonding material from adhering the substructure 214 to the sensor laminae above and below it, thus permitting sliding movement of the substructure 214 relative to such laminae. To permit the previously described relative movement between the nozzle discharge wall portions 176a, 176b when the substructure 214 is laterally deflected, inhibitor is also applied to the upper and lower surfaces of the support arms 166, 168, 170, 172 and the upper and lower surfaces of the wall members 176a, 176b. Thus, when the substructure 214 is deflected laterally, the wall members 176a, 176b slide in opposite directions between their two immediately adjacent auxiliary laminae 104a and 106a.

Figure 12:
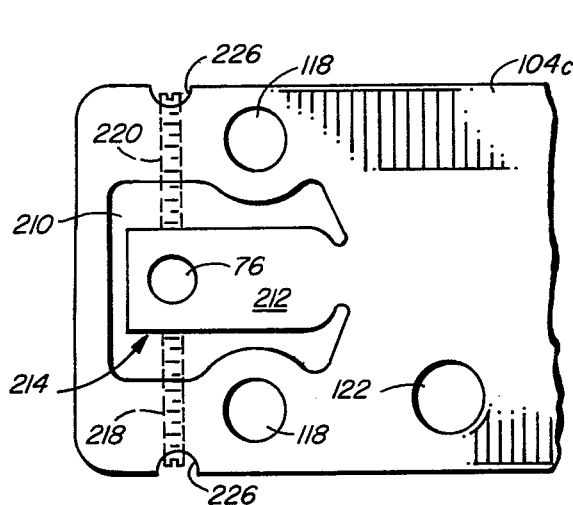
FIG. 12 is a fragmentary cross-sectional view taken through the rate sensor body along line 12—12 of FIG. 6.
Figure 13:
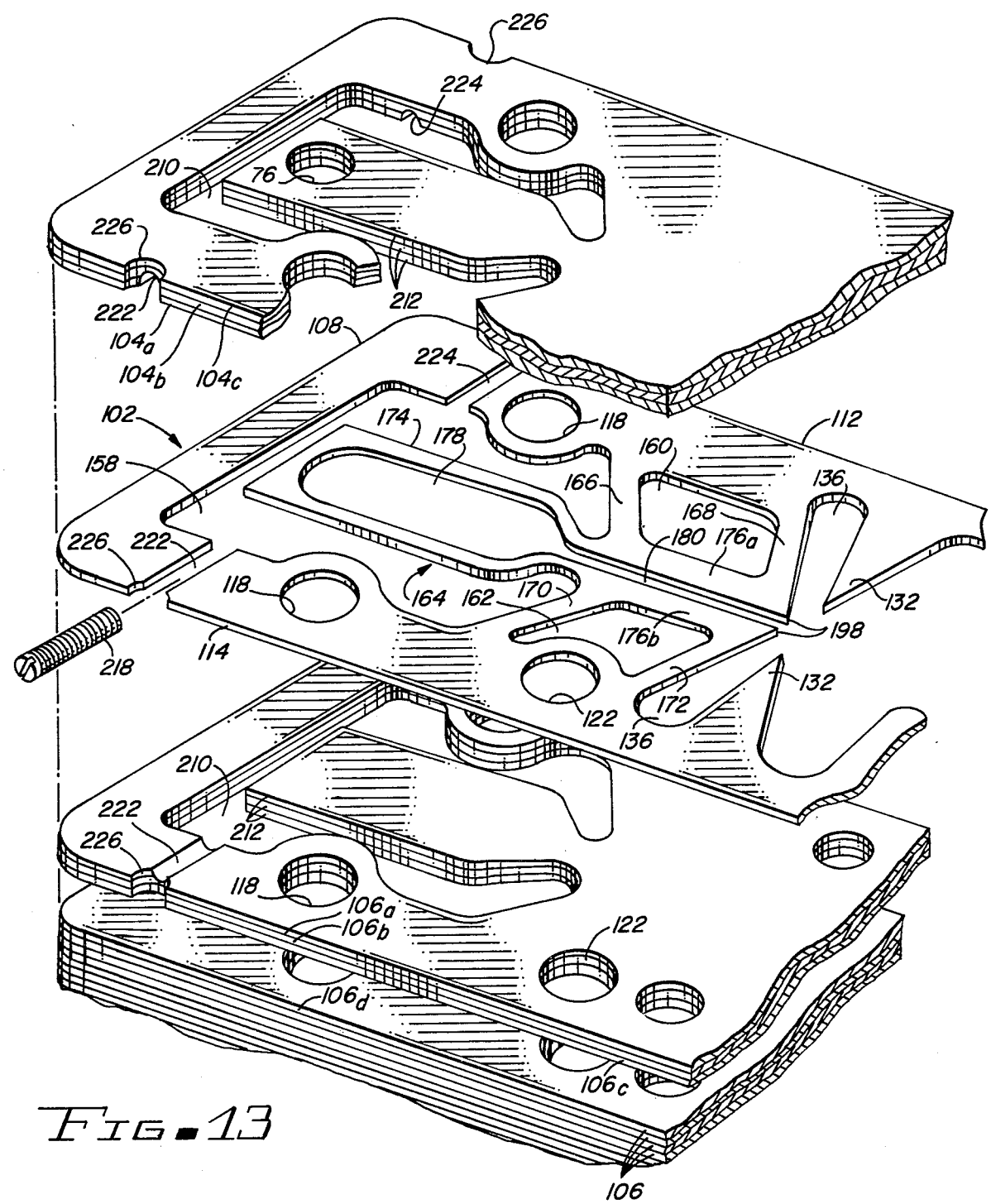
FIG. 13 is a greatly enlarged, partially exploded and fragmented view of the rate sensor body portion of FIG. 12.

The actual relative adjustment of the nozzle exit edge corner surfaces 198 is accomplished by the use of a pair of adjusting screws 218, 220 (FIG. 12). Screws 218, 220, respectively, extend laterally inwardly through a pair of oppositely disposed threaded openings 222, 224 (FIG. 13) formed through the sensor body adjacent its left end, and bear against the opposite sides of the adjustment substructure 214. To facilitate the proper location of such openings 222, 224 in the sensor body, an opposed pair of alignment notches 226 are formed in each of the laminae 104a, 104b, 104c, 102, 106a, 106b, 106c slightly forwardly of the left end of the adjustment substructure 214. In the completed sensor body, these alignment notches 226 provide an easily visible guide area through which to tap the screw openings 222, 224.

The screws 218, 220 provide for simple, yet very precise, adjustment of the substructure 214 (and thus the adjustment of the jet separation points). For example, to effect an upward deflection of the substructure 214 in FIG. 12, the upper adjusting screw 220 is backed off slightly and the upward adjustment of the substructure 214 is made by tightening the other screw 218. When the proper amount of upward deflection is accomplished, the upper screw 220 is again tightened against the adjusting substructure 214 to solidly lock it in its adjusted position.

Referring again to the graph of FIG. 9, this last-mentioned nozzle asymmetry adjustment warps an intermediate portion of the jet's operation curve B (which results from making the first adjustment to compensate for the splitter misalignment), as indicated by the solid line curve portion $B_1$, creating in curve B a flat portion X which extends horizontally along the $N_{Re}$ line. Within the range of Reynolds numbers represented by the flattened curve portion X, the pressure differential between the sensor's receiving passages 142, 144 (and thus between the sensor outlet passages 78, 80) at zero angular rotation of the sensor about control axis 194 is substantially zero.

Stated otherwise, on portions of the altered operating curve B to the right or left of its flattened portion X, variation of the jet's Reynolds number causes the jet's axis to variably deflect or "drift" relative to the nozzle flow axis. The Reynolds number (which is the product of the jet fluid's density, velocity, and hydraulic diameter divided by its visocity), for a given jet velocity and cross-sectional configuration, is mainly dependent upon the jet's temperature and pressure. Thus, it is primarily changes in these two parameters (arising from changes in the environment to which the sensor is subjected) which cause the undesirable jet drift in the curve B portions outside the flattened curve portion X therein.

The third step of the calibration method of the present invention comprises controlling the Reynolds number of the jet such that its actual operation point P is maintained along the $B_1$ curve portion X. This accomplished by the control system 90 (FIG. 5) which senses the jet's temperature and pressure and utilizes these parameters, in a manner described below, to control the jet's Reynolds number and maintain it within the confines of the curve portion X along which there is no appreciable false pressure differential present at the sensor outlets.

Referring to FIG. 5, the Reynolds number control system or jet control means 90 (which, like the other components of the rate sensing system 14, is housed within the insulated canister 60) includes a pressure sensor 230 and a temperature sensor 232. Pressure sensor 230 has a first air inlet 234 coupled to the supply air passage system 84 by a branch passage 236, and a second air inlet 238 which is open to the interior of the canister 60. The pressure differential between the pressure sensor inlets 234, 238 is indicative of the jet pressures within the rate sensors 74 and produces from the pressure sensor 230 an electrical output signal 240 which is received by an electrical operational amplifier 242.

Temperature sensor 232 is an electrical semiconductor device which is secured to and senses the temperature of one of the rate sensor bodies 100 as indicated in FIG. 5. Such sensor body temperature is substantially identical to that of the jet within such body as well as the other two rate sensor jets. As the sensor body temperature changes, the temperature sensor 232 experiences a substantially identical temperature change, thus proportionally varying its resistance. An electrical signal corresponding to such resistance change is sent to the operational amplifier 242 via an electrical output lead 246 interconnected between temperature sensor 232 and the operational amplifier 242. Power is respectively supplied to the pressure sensor 230, the temperature sensor 232, and the operational amplifier 242 by sub-branches 244a, 244b, 244c of a branch electrical lead 244 connected to the main power leads 62.

These pressure and temperature input signals 240, 246, which together are indicative of the actual jet Reynolds numbers, produce from the amplifier 242 an output signal 248 whose magnitude is directly proportional to such actual Reynolds numbers. Output signal 248 is transmitted to an electric speed controller 250 which, in turn, controls the speed of the variable speed motor 83 via an output lead 252. Variations in the speed of the motor 83, in turn, vary the volume of air supplied to the rate sensors 74 by the pump 82 via the supply passage network 84. In this manner, the velocities of the rate sensor jets are automatically varied to maintain such Reynolds numbers on the flattened curve X (FIG. 9) as previously described, thus maintaining the Reynolds numbers within a predetermined range.

As an example of the operation of the Reynolds number control system 90, let it be assumed that the amplifier 242 has been set to maintain each of the jets' Reynolds number at the operating point P in Fig. 9, and that the jets' temperatures and pressures then experience a variation which increases the jets' Reynolds numbers such that each jet's operation point P is shifted rightwardly in FIG. 9 to point $p_1$. The operational amplifier 242 senses these temperature and pressure variations (via its pressure and temperature signals 240, 246), which have increased the Reynolds numbers of the jets beyond their desired operating values, and automatically decreases the strength of its output signal 248.

This decrease lowers the speed of the motor 83 and thus decreases the flow rate of air supplied to each of the rate sensors 74. The flow rate decrease, in turn, lowers the jet velocity in each of the rate sensors by an amount sufficient to reduce its Reynolds number to the proper value P. Conversely, variations in the jet temperature and pressure causing a reduction in the set point Reynolds number of each jet causes an increase in the strength in the output signal 248 of the operational amplifier which increases the speed of the motor 83 and causes an increase in jet velocity to correctively increase each of the jets' Reynolds number.

The components of the Reynolds number control system 90 cooperatively function to environmentally stabilize the operation of the calibrated rate sensors 74. It should be noted that the insulated and airtight canister 60 aids in shielding the rate sensing system 14 from rapid or large variations in temperature and pressure. Additionally, by setting the operational amplifier to maintain each of the jets' operating points P on a generally central point of the flattened curve portion X, the resulting initial limited variations in the jets' Reynolds numbers are easily kept within such curve portion to prevent false pressure differentials at the sensor output.

Fluidic-to-Electric Output System 86

The outlets 78, 80 of each of the rate sensors 74 are fluidically coupled to one of the three output systems 86 as indicated in FIG. 5. Each of the output systems 86 includes fluidic and electric devices which are arranged in a novel manner to convert the fluidic output signals of its rate sensor to the highly accurate electric output control signals 18. For purposes of illustration, the upper output system 86 in FIG. 5 will be described, the other two output systems 86 being identical thereto.

Output system 86 includes three fluidic proportional amplifiers 256, 258, 260 which are coupled in a cascaded or series arrangement to the rate sensor outlets 78, 80, a pair of fluidic oscillators 262, 264, and a pair of microphone type pressure-to-electric transducers 266, 268. As indicated in FIG. 6, each of the fluidic amplifiers and oscillators of the output system 86 comprises a metal main lamina having a peripheral configuration substantially identical to those of the laminae in the rate sensor 74. The amplifier and oscillator laminae are interleaved between a number of auxiliary laminae 270 and define therewith an output body 272. The various laminae of the output body 272 and the rate sensor body 100 are mutually aligned and then bonded together to form a combined rate sensor and fluidic output body 274.

The auxiliary laminae 270 of the output body 272 have various openings formed therein which cooperatively define internal passages in the output body 272 that fluidically couple the amplifier laminae 256, 258, 260 and the oscillator laminae 262, 264 in a manner schematically illustrated in FIG. 5. A first pair 276 of such internal passages couples the rate sensor outlet passages 78, 80 to the control ports of the first fluidic amplifier 256. A second pair 278 of internal passages couples the outlets of the first amplifier 256 to the control ports of the second amplifier 258, and a third pair 280 of internal passages couples the outlets of the second amplifier 258 to the control ports of the third or terminal amplifier 260. A fourth pair 282 of such internal passages couples the outlets of the terminal amplifier 260 to the inlet ports of fluidic oscillators 262, 264. Each of the control ports of the oscillators 262, 264 is fluidically coupled to one of its two outlets by one of four internal passages 284 also defined by the auxiliary laminae 270 within the outlet body 272. Finally, such auxiliary laminae 270 also define three branch air supply passages 286, each of which couples one of the inlet ports of the amplifiers 256, 258, 260, to the main supply air passage system 84.

Extending upwardly through the output body 272 adjacent its left end is an upward continuation of the sensor inlet passage 76. Also extending upwardly through the output body 272, on opposite sides of the inlet passage 76, are two output passages 288, 290. Output passages 288, 290 respectively communicate with one of the oscillator passages 284 of the oscillator 262, and with one of the oscillator passages 284 of the oscillator 264. In a manner subsequently described, such passages 288, 290 are respectively connected to the inlets of the transducers 266, 268.

While the construction and operation of the conventional amplifier laminae 256, 258, 260, and the conventional oscillator laminae 262, 264, are well known in the fluidics art, a brief description of such construction and operation will now be given in order to more clearly illustrate the unique and advantageous operation of the output system 86.

Referring again to FIG. 5, the supply air branch passages 286 force fluid jets 296 through interaction channels in each of the amplifier laminae 256, 258, 260, each jet being centered between its amplifier's outlet passages which are positioned opposite the amplifier's inlet. Air entering the amplifier's control ports, which are positioned on opposite sides of the jet between the amplifier's inlet port and its outlet ports, deflects the jet in a sense and to a degree indicative of the pressure differential between the amplifier control port passages. This deflection, in turn, creates an amplified pressure differential in the amplifier's outlet passages.

As an example of the operation of the amplifiers 256, 258, 260, if the rotation-induced pressure in the rate sensor receiving passage 142 is greater than the pressure in its receiving passage 144, the pressure in the lower control port supply passage 276 (FIG. 5) is correspondingly greater than the pressure in the upper passage 276. This pressure differential causes an upward deflection of the jet 296 of the first amplifier 256. Such upward deflection of the jet creates in the amplifier outlet passages 278 an amplified pressure differential—the pressure in the upper passage 278 being greater than the pressure in the lower passage 278. This pressure differential, in turn, causes a downward deflection of the jet 296 of the second amplifier 258, and a further amplified pressure differential in the outlet passages 280 of the second amplifier 258 (the pressure in the lower passage 280 being greater than the pressure in the upper passage 280). This pressure differential creates the third stage of amplification, upwardly deflecting the jet 296 of the terminal amplifier 260 and causing a higher pressure in the upper amplifier outlet passage 282 than in the lower passage 282.

The oscillators 262, 264 are similar in construction to the amplifiers which precede them in the output system 86, the oscillators each having an internal jet 298 flowing inwardly from the outlet passages 282 of the terminal amplifier 260. However, because the oscillators have their outlet ports fluidically connected to their control ports by the passages 284 as previously described, jets 298 are caused to rapidly oscillate. This oscillation alternately pressurizes the upper and lower passages 284 of each of the oscillators. The frequency of such oscillation is directly proportional to the pressure in the oscillator's inlet passage 282. For each of the oscillators, such jet oscillation creates in its upper and lower outlet passages 284 pressure pulses of this same frequency.

The result is that corresponding pressure pulses are created in the passages 288, 290 which fluidically connect one of the oscillator passages 284 of the oscillator 262 to the transducer 266, and one of the oscillator passages 284 of the oscillator 264 to the transducer 268. The pressure pulses in such passages 288, 290 thus have frequencies directly proportional to the pressures in the upper and lower outlet passages 282 of the terminal amplifier 260.

The different frequency pulsations in the transducer inlet passages 288, 290 respectively drive the transducers 266, 268 to thereby create in the output leads 64 two sinusoidal output signals having a frequency differential extremely accurately reflecting the pressure differential in the rate sensor receiving passages 142, 144. The frequency of the electrical outputs in the output leads 64, which together constitute the output signal 18a (or 18b or 18c as the case may be) may then be automatically subtracted, for example at the autopilot computer center of an airplane, to precisely indicate the actual angular rate of the controlled body about one of its control axes.

The unique coupling of the fluidic amplification and oscillation means just described allows the use of the very inexpensive microphone (or "digital") type transducers 266, 268 instead of much more expensive analog type transducers. Since the transducers 266, 268 of each output system 86 are responsive to the frequency of their inputs (instead of the input signal amplitude as with analog transducers), much less power is required to operate them. Moreover, since the frequency-responsive transducers 266, 268 are substantially smaller and lighter than their analog counterparts, a much better response is achieved with greatly reduced hysteresis and the like.

Because of the extreme accuracy built into the rate sensors 74 as previously described, the output system 86 add no significant error to the rate sensor output signals 78, 80, despite the fact that such signals are greatly amplified by the output systems.

It should be noted that, while three amplifiers are used in each of the indicated output systems, a greater or lesser number could be used if desired, depending upon the size of the rate sensors and the type of transducers used. The cascaded amplifier arrangement indicated in FIG. 5 allows the use of standard, readily available fluidic proportional amplifiers to conveniently achieve the rather high degree of amplification necessary—a degree somewhat difficult to obtain with a single commercially available amplifier in many applications of the rate sensing system 14. Of course, if desired, a single, specially manufactured amplifier having sufficient power could be used to replace the three amplifiers indicated in each of the output systems 86.

Since the transducer pairs 266, 268 produce electrical outputs whose frequency differential is indicative of the pressure differential in the receiving passages of the rate sensor to which the transducers are fluidically coupled, the sum of the frequencies of such electrical outputs is indicative of the rate sensor's jet pressure. Thus, instead of using the pressure sensor 230, which transmits the pressure output signal 240 to the operational amplifier 242 of the Reynolds number control system 90, an electronic frequency summer may be used. The frequency summer (indicated in phantom at 302 in FIG. 5), which replaces the pressure sensor 230 and functions as a pressure sensing means, is connected to one of the transducer pairs by an electrical lead 304. Lead 304 is connected to a summing lead 306 interconnected between one of the transducer pairs 266, 268. Summer 302 transmits an electrical output signal 308 to the operational amplifier, the output signal 308 being indicative of the rate sensor jet pressures.

Alternate Embodiment of the Rate Sensor

Figure 14:
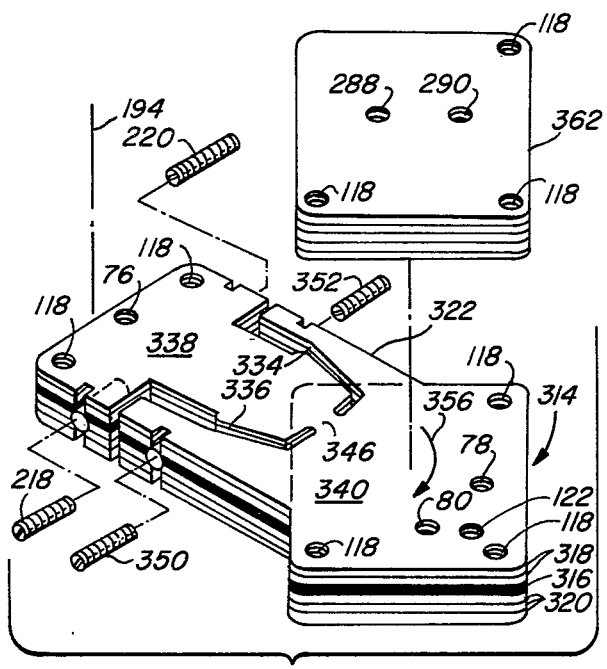
FIG. 14 is a partially exploded perspective view of an alternate embodiment of the rate sensor and output body shown in FIG. 6.

An alternate embodiment of the rate sensor 74 is depicted in FIG. 14 and indicated generally by the reference numeral 314. Like the rate sensor 74, the rate sensor 314 includes a main sensor lamina 316 sandwiched between auxiliary laminae 318 above it and auxiliary laminae 320 below it. The laminae 316, 318, 320 are of substantially identical peripheral configuration and are mutually bonded together to form a monolithic metal sensor body 322.

Figure 15:
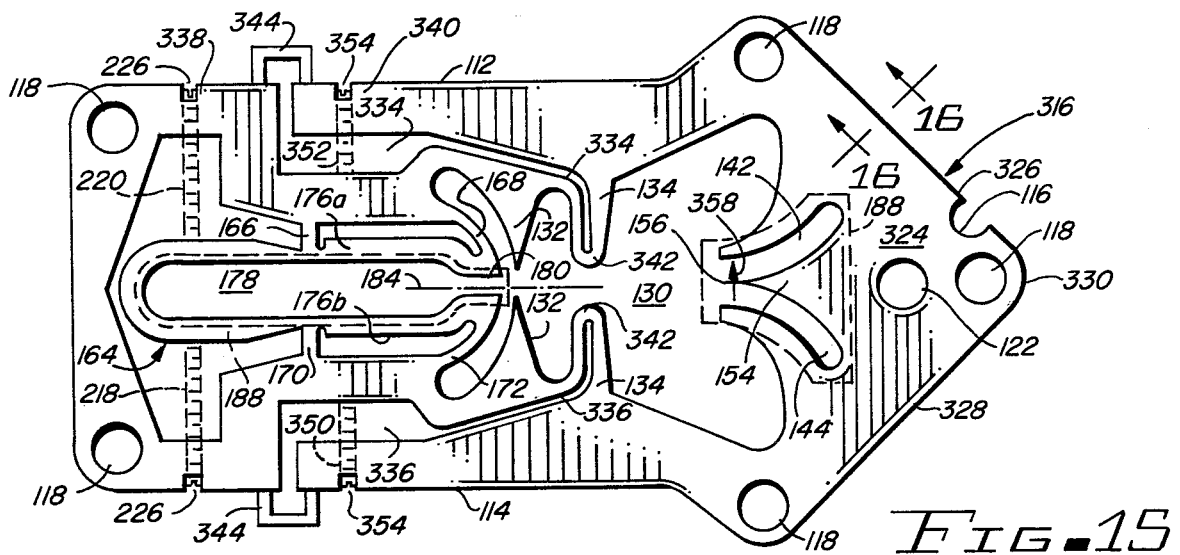
FIG. 15 is a top plan view of an alternate embodiment of the main rate sensor lamina of FIG. 7.
Figure 16:
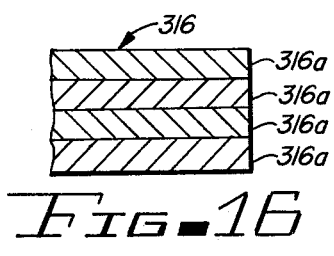
FIG. 16 is a greatly enlarged cross-sectional view taken through the alternate rate sensor lamina embodiment along line 16—16 of FIG. 15.

The main sensor lamina 316 is illustrated in FIG. 15 and is formed from several sublaminae 316a as indicated in FIG. 16. Although the lamina 316 in FIG. 15 appears slightly smaller than the main lamina 102 in FIG. 7, it is actually much longer and wider then the lamina 102, being particularly adapted to the inertial navigation portion of the graph in FIG. 3 (whereas the lamina 102 and rate sensor 74 are well suited to applications in the left portion of the graph of FIG. 3).

Lamina 316 is generally of an elongated rectangular shape, having at its right end a generally triangularly shaped portion 324 having a pair of perpendicular, equal length side edges 326, 328, which are angled forwardly and inwardly to define at their juncture a rounded forward corner 330 of the lamina 316 which is laterally centered relative thereto.

Except for the differences subsequently described, the structure and operation of the lamina 316 is quite similar to that of the previously described main lamina 102 of FIG. 7. For ease in comparison, the portions of the lamina 316 similar in configuration and operation to those of lamina 102 have been given identical reference numbers. Lamina 316 has a nozzle section 164 through which is formed an inlet passage 178 and a nozzle discharge passage 180, such passages defining a pair of oppositely disposed wall members 176a, 176b which are carried by support arms 166, 168, 170, 172. The nozzle discharge passage 180 opens forwardly into an interaction chamber 130 which defines opposed pairs 132, 134 of guide vanes spaced forwardly of the nozzle discharge passage 180. At the right end of the interaction channel 130 is a splitter member 154, having a leading splitter edge 156, upon opposite sides of which are positioned receiving passages 142, 144 which extend forwardly from the interaction channel 130. Formed in the front portion side edge 316 adjacent the forward corner 330 is an alignment notch 116. Also formed through the lamina 316 are five mounting openings 118, and an air transfer opening 122.

In constructing the sensor lamina 316, the illustrated openings and surface (except those within the dotted line envelopes 188) are formed by a chemical etching process in each of the sublaminae 316a. The chemically etched sublaminae are then stacked in precise alignment and bonded together to form the main lamina 316. Finally, the areas within the dotted line envelopes 188 (including the nozzle inlet and discharge passages 178, 180, the splitter edge 156, and the receiving passages 142, 144) are formed in the assembled lamina 316 by the previously described EDM process.

For reasons described below, a pair of opposed symmetrical calibration channels 334, 336 are formed through the lamina 316. Each of the channels 334, 336 extends laterally inwardly through one of the lamina side edges 112, 114, slightly rearwardly of the support arms 166, 170, then extends forwardly past the nozzle discharge passage 180, and finally turns laterally inwardly into one of the guide vanes 134. These channels 334, 336 divide the lamina 316 into two sections 338, 340 which are held together only by thin end portions 342 of the forward guide vanes 134. To provide a greater degree of structural rigidity to the lamina 316 prior to the assembly of the sensor body 322, generally U-shaped thin support members 344 are formed on the lamina 316 to hold the two lamina sections 338, 340 together. Each of the support members 344 projects laterally outwardly of the lamina 316 and interconnects adjacent portions of the lamina sections 338, 340 adjacent the entrance points of the calibration channels 334, 336.

As indicated in FIG. 14, each of the auxiliary laminae 318, 320 has formed therein similarly configured and positioned calibration channels 334, 336 so that the assembled laminated body 322 is divided into rear and forward sections 338, 340 which are connected by a thin body portion or joining section 346 positioned between the opposite ends of the aligned calibration channels 334, 336. Each of the auxiliary laminae 318, 320 has initially formed thereon generally U-shaped support members 344 similar to those formed on the main lamina 316. When all of the laminae are bonded together to form the sensor body 322, all of the support members 344 are ground away or otherwise removed, leaving the body portions 338, 340 supported only by the small joining section 346.

The rate sensor 314 operates in substantially the same manner as does the previously described rate sensor 74. An inlet passage 76 extends downwardly through the rate sensor body 322 and into the inlet channel 178. Supply air entering the inlet channel 178 is forced in jet form outwardly through the nozzle discharge passage 180, forwardly traverses the interaction channel 130 and impinges upon the leading splitter edge 156 where the jet is divided and diverted into the receiving passages 142, 144. Such receiving passages 142, 144 respectively communicate with outlet passages 78, 80 extending upwardly through the sensor body 322 adjacent its right end as indicated in FIG. 14.

Unlike the rate sensor 74, the first sensor calibration step (i.e., that of compensating for splitter offset) is not accomplished by adjustably venting one of the receiving passages 142, 144. Rather, such first calibration step is accomplished by bending the sensor body 322 about an axis parallel to its control axis 194 to thereby actually move the leading splitter edge 156 into precise alignment with the nozzle axis 184.

This adjustable bending of the sensor body 322 is effected by a pair of adjusting screws 350, 352. Screws 350, 352 extend laterally inwardly through threaded openings formed through the opposite outer side surfaces of the forward sensor body portion 340 slightly forwardly of its rearward termination. The adjusting screws 350, 352 extend inwardly through the opposite calibration channels 334, 336 and bear upon opposite side surfaces of the rear sensor body portion 338 as indicated in phantom in FIG. 15. Guide notches 354 are formed in the main lamina 316, and several of the auxiliary laminae 318, 320 above and below it, to visually define the proper area through which such threaded openings are formed in the sensor body 322.

As an example of how these adjusting screws 350, 352 are used to precisely align the splitter edge 156 with the nozzle axis 184, let it be assumed that in FIG. 15 the as-fabricated splitter edge 156 is offset slightly downwardly of the nozzle axis 184. To correct for this fabricational inaccuracy, the adjusting screw 350 (FIG. 14) is backed off slightly and the opposite adjusting screw 352 is tightened against the rear body portion 338 to thereby slightly pivot the forward body portion 340 in a clockwise direction as indicated by the arrow 356 in FIG. 14. This clockwise pivoting of the forward body section 340 moves the splitter edge 156 slightly upwardly as indicated by the arrow 358 in FIG. 15, to bring it into alignment with the nozzle axis 184.

When the desired upward deflection of the splitter edge 156 is obtained by tightening the adjusting screw 352, the other adjusting screw 350 is then tightened against the rear sensor body section 338 to positively lock the splitter edge 156 in its properly aligned position.

The second calibration step, that of compensating for nozzle asymmetry, is accomplished in substantially the same manner as was previously described for the rate sensor 74—namely by the use of the oppositely disposed adjusting screws 218, 220 which extend inwardly through guide notches 226 formed through the lamina 316 (and several of the auxiliary laminae directly above and below it) and bear against a left end portion of the nozzle section 164. The application of inhibitor to certain portions of the nozzle section 164, the opposite wall members 176a, 176b, and the support arms 166, 168, 170, 172 is performed in a manner identical to that previously described in conjunction with the corresponding portions of the rate sensor 74, to thereby permit movement of the wall members 176a, 176b within the sensor body 322 to effect precise alignment of the jet separation points, also as previously described.

The Reynolds number control system 90 (FIG. 5) is used as previously described to environmentally stabilize the operation of the rate sensor 314.

The fluidic components of the output system 86 (namely the cascaded amplifiers 256, 258, 260 and the oscillators 262, 264) are assembled to define an output stack 362 comprised of main and auxiliary laminae as described for the output stack or body 272 of FIG. 6. In the case of the larger rate sensor body 322 (FIG. 14), each of the laminae in the output stack 362 is of a standard size, having a square configuration. The forward side edges 326, 328 (FIG. 15) of the main sensor lamina 316 and its auxiliary laminae have lengths identical to the lengths of the sides of the output body 362. As indicated in FIG. 14, the output stack or body 362 is positioned on top of the generally triangular portion of the forward sensor body section 340 with a pair of adjacent side edges of the output body 362 being aligned with the two forwardly facing side edges of such triangular body portion.

It can be seen in FIG. 14 that a rear corner portion of the output stack 362 extends rearwardly beyond the narrow body portion 346 which holds the forward and rear sensor body portions 340, 338 together. For this reason, the undersurface of such overlapping corner portion of the output body 362 is coated with an inhibitor prior to the bonding of the laminae in the sensor body and output body. This permits the previously described bending of the sensor body by allowing such corner portion to slide over the upper surface of the rear sensor body section 338.

Like their FIG. 6 counterparts, the auxiliary laminae in the sensor and output bodies 322, 362 in FIG. 14 function to define various passages, channels and openings in such bodies to supply and transfer air within them. For example, the transfer opening 122 in the main sensor laminae 316 and the auxiliary laminae 318 above it define a transfer passage which communicates with the inlet passage 76 and transfers air upwardly into the main amplifier and oscillator laminae in the output body. Such amplifier and oscillator laminae are fluidically interconnected within the output body 362 in a manner schematically depicted in FIG. 5 and previously described. Output passages 288, 290 extend upwardly through the output body 362 for connection to one of the transducer pairs 266, 268.

Construction, Arrangement and Operation of the Rate Sensing System

The assembled rate sensing system 14 is shown in FIGS. 17 and 18 and is mounted on the underside of the canister end plate 73. For supporting various components of the rate sensing system, an elongated metal support member 364 is provided. Support member 364 has a base plate portion 366, a pair of oppositely disposed mounting legs 368, 370 extending rearwardly (i.e., to the left in FIG. 17 and to the right in FIG. 18) from the base plate portion, and an elongated mounting block 372 extending forwardly from such base plate.

The support member 364 is secured to the canister end plate 73 by screws 374 extending rearwardly through each of the mounting legs 368, 370.

The mounting block 372 has a substantially planar outer end surface 376, a pair of substantially planar longitudinally extending, mutually spaced side surfaces 378, 380, and a forward end portion 382 extending rearwardly a short distance from the outer end surface 376 and projecting upwardly between the side surfaces 378, 380. The planes of the side surfaces 378, 380 are perpendicular to each other and to the outer end surface 376.

One of the three combined rate sensor and output bodies 274 (FIG. 6) is mounted on each of the mutually perpendicular mounting block surfaces 376, 378, 380 by means of screws 384 received through the mounting holes 118 in such bodies. The laminated bodies 274 are positioned so that their vent openings 195a, 196a, (FIG. 10) face outwardly, and their inlet and discharge openings 78, 288, 290 face inwardly. Because the mounting block surfaces 376, 378, 380 are mutually perpendicular, the control axes of the three rate sensors secured thereto are likewise mutually perpendicular.

The variable volume air pump 82 (FIG. 5) is of a circular cylindrical shape and is received in a circular bore 386 formed through the mounting block forward end portion 382. The variable speed motor 83 is attached to the pump 82 and extends between the base plate 366 and the mounting block forward end portion 382.

Each of the three transducer pairs 266, 268, (FIG. 5) is mounted within one of three generally cylindrical transducer housings 388 which are secured to the support member 364. Two of the transducer housings 388 are affixed to the support member 364 beneath the upper pair of sensor and output bodies 374 (as can be best seen in FIG. 18), and the other transducer housing 388 is mounted on the underside of the base plate 366.

The previously described supply air passage network 84 of FIG. 5 is formed within the support member 364 and interconnects the discharge of the pump 82 with the inlets of the rate sensors and the fluidic amplifiers as schematically depicted in FIG. 5. Similarly, other passages are formed within the support member 364 to fluidically interconnect the discharge passages 288, 290 from the oscillator pairs 262, 264 to the transducer pairs 266, 268 within the transducer housings 388.

The previously described pressure sensor 230, operational amplifier 242, and electronic speed controller 250 of the Reynolds number control system 90 are mounted beneath the base plate 366. The temperature sensor 232, as previously described, is mounted directly upon one of the rate sensors as indicated in FIG. 17. The supply air branch passage 236 (FIG. 5) is also formed within the support member 364 and fluidically couples the pressure sensor 230 to the main supply passage network 84 formed within such support member 364.

After the assembled rate sensing system 14 is secured to the canister end plate 73, the canister body is slipped over the assembled system and secured to the end plate 73, thus enclosing the rate sensor system 14 in the airtight, thermally insulated interior of the canister.

The canister or container 60 is easily mounted in a convenient location on the controlled body 12 (FIG. 1) and oriented so that the control axes of the three rate sensors within the canister are parallel to the desired control axes of the body 12. The output leads 64, 66, 68 are then connected to the balance of the guidance system 10 illustrated in FIG. 1, and the power input leads 62 connected to an electrical power source. Subsequent rotation of the controlled body about any of its three control axes correspondingly rotates the canister and varies the output signals 18a, 18b, 18c to rapidly return the body to the desired attitude.

It should be noted that the rate sensing system 14 is an entirely self-contained system which functions within the sealed interior of its enclosing canister. Even the air supply for its various fluidic components is drawn from within the airtight, thermally insulated canister. As indicated schematically in FIG. 5 by the arrows 390, the interaction chambers or channels of the fluidic rate sensors, amplifiers and oscillators are vented, in a conventional manner, to the canister's interior through openings (not shown in the drawings) formed in their bodies. This vented air, together with the air vented through the sensor vents 195a, 196a, is drawn into the inlet 392 of the pump 82 and forced through the supply passage system 84 during operation of the rate sensing system. Because of this closed air cycle, there is no need to introduce outside supply air into the canister.

It is important to note that the rate sensing system of the present invention has the ruggedness, low cost, and instant-on capabilities inherent in fluidic devices and systems, yet uniquely provides the first viable fluidic replacement for the mechanical gyroscope and rate sensing systems based thereon. The only moving parts in the entire electrofluidic rate sensing system described above are the air pump and its motor.

A wide variety of modifications may be made to the above described rate sensing system and methods, depending upon their particular navigational application. For example, by eliminating one or two of the fluidic rate sensors (and their associated output systems), a two or one axis rate sensing system can be constructed. Additionally, pressurized fluids other than air may be used. Also, a reverse pressure system may be utilized wherein the pump develops a higher pressure within the canister, and the jets are of a lower pressure, being developed by suction at the pump inlet. Stated otherwise, if desired, the various jets may be drawn through their component's body instead of forced therethrough. As previously mentioned, the number of fluidic amplifiers in each of the output systems may be varied if desired. Also, of course, the alternate rate sensor embodiment of FIG. 14 (or alternate rate sensors having different exterior configurations and laminae arrangements) may be employed if desired.

The foregoing detailed description is to be clearly understood as given by way of illustration and example only, the spirit and scope of this invention being limited solely by the appended claims.

What is claimed is:

1. Navigational guidance system apparatus comprising:
   (a) a laminated body rotatable about a control axis and including:
      (1) a main rate sensor lamina having an interaction channel, a nozzle portion having an inlet channel and a discharge channel opening forwardly into said interaction channel and communicating with said inlet channel, said discharge channel having a flow axis generally perpendicular to said control axis, a pair of receiving channels spaced forwardly of said nozzle portion and having inlets communicating with said interaction channel on opposite sides of said flow axis, and a splitter member positioned between said inlets and intercepted by said flow axis, said splitter member having a rearwardly facing leading edge, and
      (2) a plurality of auxiliary laminae positioned on opposite sides of said main lamina and defining in said body an inlet passage communicating with said nozzle portion inlet channel, and a pair of outlet passages each communicating with a different one of said receiving channels, whereby a fluid may be flowed inwardly through said inlet passage to form a fluid jet exiting said discharge passage along a jet axis, forwardly traversing said interaction channel, impinging upon said splitter edge and being divided thereby into two separate streams each received by one of said receiving channels to thereby create between said outlet passages a pressure differential indicative of the rate and sense of rotation of said body about said control axis; and
   (b) calibration means associated with the assembled body for correcting for fabricational inaccuracies in said main rate sensor lamina therein to render said pressure differential substantially zero during operation of said apparatus in the absence of rotation of said body about said control axis, said calibration means including means permitting movement of said nozzle portion within said laminated body, and means for exerting a selectively variable force upon said nozzle portion in a direction generally perpendicular to said flow axis to thereby precisely align said flow axis and said jet axis.

2. The apparatus of claim 1 wherein:
said nozzle portion has a first section comprising a pair of opposite wall members extending generally parallel to said flow axis and having laterally oppositely facing surfaces defining said discharge channel, and a second section positioned rearwardly of said first section;
said means permitting movement of said nozzle portion within said laminated body include at least one pair of relatively narrow support arms connecting said nozzle portion to the balance of said main rate sensor lamina, and further include means permitting movement of said support arms within said laminated body, each of said support arms extending generally laterally outwardly from a different one of said opposite wall members, whereby movement of said second section transverse to said flow axis causes flexure of said support arms and relative movement of said wall members in opposite directions generally parallel to said flow axis; and
said means for exerting a selectively variable force upon said nozzle portion include means for exerting a selectively variable force on said second section of said nozzle portion.

3. The apparatus of claim 2 wherein:
said main rate sensor lamina and said auxiliary laminae are bonded together, and at least one auxiliary lamina above said main rate sensor lamina, and at least one auxiliary lamina below it, have portions aligned with and peripherally configured substantially identically to said second nozzle portion section and defining with said second section of said nozzle portion an adjustment substructure;
said means permitting movement of said nozzle portion within said laminated body further include a bonding inhibitor upon opposite surfaces of said adjustment substructure, said support members and said wall members; and said means for exerting a selectively variable force on said second section of said nozzle portion include means for exerting a selectively variable force on said adjustment substructure.

4. The apparatus of claim 3 wherein said means for exerting a selectively variable force on said adjustment substructure include adjusting screw means threadingly engaging said laminated body and positioned for movement into and out of engagement with said adjustment substructure.

5. Navigational guidance system apparatus comprising:
(a) a laminated body rotatable about a control axis and including:
  (1) a main rate sensor lamina having an interaction channel, a nozzle portion having an inlet channel and a discharge channel opening forwardly into said interaction channel and communicating with said inlet channel, said discharge channel having a flow axis generally perpendicular to said control axis, a pair of receiving channels spaced forwardly of said nozzle portion and having inlets communicating with said interaction channel on opposite sides of said flow axis, and a splitter member positioned between said inlets and intercepted by said flow axis, said splitter member having a rearwardly facing leading edge, and
  (2) a plurality of auxiliary laminae positioned on opposite sides of said main lamina and defining in said body an inlet passage communicating with said nozzle portion inlet channel, and a pair of outlet passages each communicating with a different one of said receiving channels, whereby a fluid may be flowed inwardly through said inlet passage to form a fluid jet exiting said discharge passage along a jet axis, forwardly traversing said interaction channel, impinging upon said splitter edge and being divided thereby into two separate streams each received by one of said receiving channels to thereby create between said outlet passages a pressure differential indicative of the rate and sense of rotation of said body about said control axis; and
(b) calibration means associated with the assembled body for correcting for fabricational inaccuracies in said main rate sensor lamina therein to render said pressure differential substantially zero during operation of said apparatus in the absence of rotation of said body about said control axis, said calibration means including means for adjustably venting one of said pair of receiving channels,
said means for adjustably venting one of said pair of receiving channels including a pair of vent passages defined in said laminated body by said auxiliary laminae, each of said vent passages communicating with a different one of said receiving channels, and means for adjustably restricting one of said vent passages to selectively elevate the operating pressure of the receiving channel with which it communicates,
said one of said vent passages extending directly beneath an outermost one of said auxiliary laminae, and said means for adjustably restricting said one of said vent passages comprising a portion of said outermost one of said auxiliary laminae adapted to be deformed inwardly into said one of said vent passages.

6. Navigational guidance system apparatus comprising:
(a) a laminated body rotatable about a control axis and including:
  (1) a main rate sensor lamina having an interaction channel, a nozzle portion having an inlet channel and a discharge channel opening forwardly into said interaction channel and communicating with said inlet channel, said discharge channel having a flow axis generally perpendicular to said control axis, a pair of receiving channels spaced forwardly of said nozzle portion and having inlets communicating with said interaction channel on opposite sides of said flow axis, and a splitter member positioned between said inlets and intercepted by said flow axis, said splitter member having a rearwardly facing leading edge, and
  (2) a plurality of auxiliary laminae positioned on opposite sides of said main lamina and defining in said body an inlet passage communicating with said nozzle portion inlet channel, and a pair of outlet passages each communicating with a different one of said receiving channels, whereby a fluid may be flowed inwardly through said inlet passage to form a fluid jet exiting said discharge passage along a jet axis, forwardly traversing said interaction channel, impinging upon said splitter edge and being divided thereby into two separate streams each received by one of said receiving channels to thereby create between said outlet passages a pressure differential indicative of the rate and sense of rotation of said body about said control axis; and
(b) calibration means associated with the assembled body for correcting for fabricational inaccuracies in said main rate sensor lamina therein to render said pressure differential substantially zero during operation of said apparatus in the absence of rotation of said body about said control axis,
said calibration means including means for selectively moving said leading splitter edge to bring it into precise alignment with said flow axis of said discharge passage,
said means for selectively moving said leading splitter edge including means for adjustably bending said laminated body about an axis generally parallel to said control axis.

7. The apparatus of claim 6 wherein said laminated body has a forward section containing said splitter member and said receiving channels, a rear section containing said nozzle portion, and a joining section interconnecting said forward and rear sections between said splitter member and said nozzle portion, and said means for adjustably bending said laminated body include means for adjustably pivoting said forward section relative to said second section about said joining section.

8. The apparatus of claim 7 wherein said means for adjustably pivoting said forward section include a pair of adjusting screws threadingly engaging said forward body section and bearing against opposite side portions of said rear body section.

9. Navigational guidance system apparatus comprising:

(a) a laminated body rotatable about a control axis and including:
  (1) a main rate sensor lamina having an interaction channel, a nozzle portion having an inlet channel and a discharge channel opening forwardly into said interaction channel and communicating with said inlet channel, said discharge channel having a flow axis generally perpendicular to said control axis, a pair of receiving channels spaced forwardly of said nozzle portion and having inlets communicating with said interaction channel on opposite sides of said flow axis, and a splitter member positioned between said inlets and intercepted by said flow axis, said splitter member having a rearwardly facing leading edge, and
  (2) a plurality of auxiliary laminae positioned on opposite sides of said main lamina and defining in said body an inlet passage communicating with said nozzle portion inlet channel, and a pair of outlet passages each communicating with a different one of said receiving channels, whereby a fluid may be flowed inwardly through said inlet passage to form a fluid jet exiting said discharge passage along a jet axis, forwardly traversing said interaction channel, impinging upon said splitter edge and being divided thereby into two separate streams each received by one of said receiving channels to thereby create between said outlet passages a pressure differential indicative of the rate and sense of rotation of said body about said control axis; and
(b) calibration means associated with the assembled body for correcting for fabricational inaccuracies in said main rate sensor lamina therein to render said pressure differential substantially zero during operation of said apparatus in the absence of rotation of said body about said control axis, said calibration means including means carried by said laminated body for exerting selectively variable forces on said main rate sensor lamina to precisely align said flow axis, said jet axis, and said leading splitter edge.

10. An angular rate sensor comprising:
(a) a member rotatable about a control axis;
(b) nozzle means for receiving fluid from a source thereof and discharging a fluid jet having a jet axis, said nozzle means being carried by said member for rotation therewith and having a flow axis generally perpendicular to said control axis, said nozzle means further having a pair of wall surface areas along which portions of the fluid exiting said nozzle means separate therefrom;
(c) jet-receiving means for utilizing the jet to produce a pair of outputs adapted for comparison to determine the rate and sense of rotation of said member about said control axis,
said jet-receiving means being carried by said member for rotation therewith and including splitter means, spaced apart from said nozzle means, for dividing the jet into two streams having a relative cross-sectional area differential indicative of said rate and sense of rotation of said member; and
(d) calibration means for correcting for fabricational inaccuracies in said rate sensor to render said outputs substantially identical at zero rotational rate of said member about said control axis,
said calibration means including means for precisely aligning said jet axis and said flow axis, said axis aligning means including means for selectively adjusting the position of one of said pair of wall surface areas relative to the other of said pair of wall surface areas.

11. The rate sensor of claim 10 wherein each of said pair of wall surface areas is positioned on an opposite side of said flow axis, and said position adjusting means include means for relatively moving said pair of wall surface areas a predetermined distance in a direction generally parallel to said flow axis.

12. The rate sensor of claim 11 wherein said means for relatively moving said pair of wall surface areas include means for exerting a selectively variable force on said nozzle means in a direction generally perpendicular to said flow axis thereof.

13. The rate sensor of claim 12 wherein said means for exerting a selectively variable force on said nozzle means include an adjusting member threadingly engaging said member and bearing against said nozzle means.

14. The rate sensor of claim 10 wherein said splitter means include a leading splitter edge positioned for impingement by the jet, and said calibration means further include means for precisely aligning said splitter edge with said flow axis.

15. The rate sensor of claim 14 wherein said means for aligning said splitter edge with said flow axis include means for adjustably bending said member.

16. The rate sensor of claim 15 wherein said splitter edge is generally parallel to said control axis, and said bending means comprise means for adjustably bending said member about an axis generally parallel to said splitter edge.

17. The rate sensor of claim 16 wherein said member comprises a first section upon which said nozzle means are mounted, a second section upon which said jet-receiving means are mounted, and a relatively small third section interconnecting said first and second sections, and wherein said means for adjustably bending said member about an axis generally parallel to said splitter edge include means for adjustably pivoting said second section relative to said first section about said third section.

18. The rate sensor of claim 17 wherein said means for adjustably pivoting said second section include an adjusting member threadingly engaging one of said first and second sections and bearing against the other of said first and second sections.

19. An angular rate sensor comprising:
(a) a member rotatable about a control axis;
(b) nozzle means for receiving fluid from a source thereof and discharging a fluid jet having a jet axis, said nozzle means being carried by said member for rotation therewith and having a flow axis generally perpendicular to said control axis;
(c) jet-receiving means for utilizing the jet to indicate the rate and sense of rotation of said member about said control axis, said jet-receiving means being carried by said member for rotation therewith, being spaced apart from said nozzle means, and including:
  (1) splitter means positioned in the path of the jet for dividing it into two separate streams,
  (2) a pair of receiving passages each positioned to receive one of the streams, and
  (3) a pair of outlet passages each communicating with one of said receiving passages whereby, during operation of said rate sensor, the operational pressure differential between said outlet passages is indicative of the rate and sense of rotation of said member about said control axis; and (d) calibration means operatively associated with said nozzle means and said jet-receiving means for compensating for fabricational inaccuracies in said rate sensor causing misalignment between said splitter means and said flow axis, and said flow axis and said jet axis, to thereby render said operational pressure differential substantially zero in the absence of rotation of said member about said control axis, said calibration means including means for adjustably venting one of said receiving passages, said jet-receiving means further including a pair of vent passages each communicating with one of said receiving passages, and said means for adjustably venting one of said receiving passages including means for adjustably restricting one of said vent passages, a portion of said one of said vent passages extending inwardly adjacent and generally parallel to an exterior surface portion of said rate sensor, said exterior surface portion being adapted to be deformed a predetermined distance into said portion of said one of said vent passages, said means for adjustably restricting one of said vent passages including said exterior surface portion of said rate sensor.

20. An angular rate sensor comprising:
(a) a member rotatable about a control axis,
(b) nozzle means for receiving fluid from a source thereof and discharging a fluid jet having a jet axis, said nozzle means being carried by said member for rotation therewith and having a flow axis generally perpendicular to said control axis;
(c) jet-receiving means for utilizing the jet to indicate the rate and sense of rotation of said member about said control axis, said jet-receiving means being carried by said member for rotation therewith, being spaced apart from said nozzle means, and including:
  (1) splitter means positioned in the path of the jet for dividing it into two separate streams,
  (2) a pair of receiving passages each positioned to receive one of the streams, and
  (3) a pair of outlet passages each communicating with one of said receiving passages whereby, during operation of said rate sensor, the operational pressure differential between said outlet passages is indicative of the rate and sense of rotation of said member about said control axis; and
(d) calibration means operatively associated with said nozzle means and said jet-receiving means for compensating for fabricational inaccuracies in said rate sensor causing misalignment between said splitter means and said flow axis, and said flow axis and said jet axis, to thereby render said operational pressure differential substantially zero in the absence of rotation of said member about said control axis, said calibration means including means for moving said splitter means into precise alignment with said flow axis, said means for moving said splitter means including means for adjustably bending said member about an axis generally parallel to said control axis.

21. The rate sensor of claim 20 further comprising means for locking said member in a desired bent position.

22. The rate sensor of claim 21 wherein said means for adjustably bending said member and said means for locking said member in a desired bent position comprise a pair of adjusting members threadingly engaging a first portion of said member and bearing upon opposite sides a second portion of said member.

23. An angular rate sensor comprising:
(a) a member rotatable about a control axis;
(b) nozzle means for receiving fluid from a source thereof and discharging a fluid jet having a jet axis, said nozzle means being carried by said member for rotation therewith and having a flow axis generally perpendicular to said control axis;
(c) jet-receiving means for utilizing the jet to indicate the rate and sense of rotation of said member about said control axis, said jet-receiving means being carried by said member for rotation therewith, being spaced apart from said nozzle means, and including:
  (1) splitter means positioned in the path of the jet for dividing it into two separate streams,
  (2) a pair of receiving passages each positioned to receive one of the streams, and
  (3) a pair of outlet passages each communicating with one of said receiving passages whereby, during operation of said rate sensor, the operational pressure differential between said outlet passages is indicative of the rate and sense of rotation of said member about said control axis; and
(d) calibration means operatively associated with said nozzle means and said jet-receiving means for compensating for fabricational inaccuracies in said rate sensor causing misalignment between said splitter means and said flow axis, and said flow axis and said jet axis, to thereby render said operational pressure differential substantially zero in the absence of rotation of said member about said control axis, said calibration means including means for precisely aligning said jet axis and said flow axis, said axis aligning means including means for exerting a selectively variable force upon said nozzle means in a direction generally perpendicular to said flow axis.

24. The rate sensor of claim 23 wherein said nozzle means have a discharge passage and a pair of wall members having surfaces defining at least a portion of said discharge passage, and said axis aligning means include said pair of wall members and means responsive to the exertion of said selectively variable force upon said nozzle means for causing said pair of wall members to move in opposite directions generally parallel to said flow axis.

25. The rate sensor of claim 23 wherein said nozzle means have a pair of exit corner surfaces along which the jet separates from said nozzle means at separation points on said pair of exit corner surfaces, and said axis aligning means include means for relatively moving said pair of exit corner surfaces to precisely align said separation points.

26. An angular rate sensor comprising:
(a) a member rotatable about a control axis,
(b) nozzle means for receiving fluid from a source thereof and discharging a fluid jet having a jet axis, said nozzle means being carried by said member for rotation therewith and having a flow axis generally perpendicular to said control axis;

(c) jet-receiving means for utilizing the jet to indicate the rate and sense of rotation of said member about said control axis, said jet-receiving means being carried by said member for rotation therewith, being spaced apart from said nozzle means, and including:
  (1) splitter means positioned in the path of the jet for dividing it into two separate streams,
  (2) a pair of receiving passages each positioned to receive one of the streams, and
  (3) a pair of outlet passages each communicating with one of said receiving passages whereby, during operation of said rate sensor, the operational pressure differential between said outlet passages is indicative of the rate and sense of rotation of said member about said control axis; and (d) calibration means operatively associated with said nozzle means and said jet-receiving means for compensating for fabricational inaccuracies in said rate sensor causing misalignment between said splitter means and said flow axis, and said flow axis and said jet axis, to thereby render said operational pressure differential substantially zero in the absence of rotation of said member about said control axis, said splitter means including a leading splitter edge, and said calibration means including means for precisely mutually aligning said splitter edge, said flow axis and said jet axis, and said means for mutually aligning said splitter edge, said flow axis and said jet axis including means for adjustably bending said nozzle means and said member about axes generally parallel to said control axis.

27. The angular rate sensor of claim 10, 20 or 23 in which said rate sensor has a jet length of between approximately 0.5 cm and approximately 1.5 cm, accuracy of between approximately $0.3 \times 10^{-3}$ radians/second and approximately $0.008 \times 10^{-3}$ radians/second, and a bandwidth of between approximately 800 Hz and approximately 100 Hz.

28. The angular rate sensor of claim 10, 20 or 23 in which said rate sensor has a jet length of between approximately 1.5 cm and approximately 4.2 cm, accuracy between approximately $0.008 \times 10^{-3}$ radians/second and approximately $0.003 \times 10^{-3}$ radians/second, and a bandwidth of between approximately 100 Hz and approximately 8 Hz.

29. The angular rate sensor of claim 10, 20 or 23 in which said rate sensor has a jet length of between approximately 4.2 cm and approximately 7.5 cm, accuracy between approximately $0.003 \times 10^{-3}$ radians/second and approximately $0.00006 \times 10^{-3}$ radians/second, and a bandwidth of between approximately 8 Hz and approximately 2 Hz.

30. Angular rate sensing apparatus comprising:
(a) a fluidic angular rate sensor having jet-forming means for receiving fluid from a source thereof and discharging a fluid jet, and jet-receiving means spaced from said jet-forming means for utilizing said jet to create a pair of fluidic output signals having a relative pressure differential indicative of the rate and sense of rotation of said rate sensor about a control axis;

(b) means for supplying fluid to said jet-forming means; and (c) jet-control means operatively associated with said fluid-supplying means for maintaining the Reynolds number of said jet within a predetermined range to thereby environmentally stabilize the operation of said rate sensor, said jet-control means including means for sensing the temperature of said jet, means for sensing the pressure of said jet, and means for varying the velocity of said jet in response to the sensed temperature and pressure thereof.

31. The angular rate sensing apparatus of claim 30 wherein said fluid-supplying means include a pump having an outlet communicating with said jet-forming means, and a motor drivingly connected to said pump, and said means for varying the velocity of said jet include means for varying the speed of said motor to thereby vary the volumetric flow rate of the fluid supplied to said jet-forming means.

32. Angular rate sensing apparatus comprising:
(a) a fluidic angular rate sensor having jet-forming means for receiving fluid from a source thereof and discharging a fluid jet, and jet-receiving means spaced from said jet-forming means for utilizing said jet to create a pair of fluidic output signals having a relative pressure differential indicative of the rate and sense of rotation of said rate sensor about a control axis;

(b) means for supplying fluid to said jet-forming means, and (c) means for compensating for pressure and temperature changes in said jet to assure that variations in the position of said jet relative to said jet-receiving means occur substantially solely due to variations in said rate and sense of rotation of said rate sensor about said control axis, said compensating means including means for maintaining the Reynolds number of said jet within a predetermined range, said means for maintaining the Reynolds number of said jet within a predetermined range including means for sensing variations in the Reynolds number of said jet, and means responsive to the sensed Reynolds number variations for varying the velocity of said jet.

33. The angular rate sensing apparatus of claim 32 wherein said means for sensing variations in the Reynolds number of said jet include means for sensing variations in the temperature and pressure of said jet.

34. A navigational guidance system comprising:
(a) fluidic angular rate sensor means for receiving fluid from a source thereof, forming a jet from the received fluid, and utilizing the jet to create a duality of fluidic output signals adapted for comparison to determine the rate and sense of rotation of said rate sensor means about a control axis;

(b) a pump;

(c) supply passage means for supplying fluid discharged from said pump to said rate sensor means;

(d) a variable speed motor drivingly connected to said pump; and (e) a Reynolds number control system adapted to maintain the Reynolds number of said jet within a predetermined range and comprising:
  (1) pressure sensing means for sensing the pressure of said jet and transmitting an output signal indicative of the sensed pressure, (2) temperature sensing means for sensing the temperature of said jet and transmitting an output signal indicative of the sensed temperature, (3) speed controller means operable to vary the speed of said variable speed motor, and (4) operational amplifier means for receiving said output signals from said pressure sensor means and said temperature sensor means and, in response to the received output signals, for operating said speed controller means to maintain a predetermined relationship between the temperature, pressure and velocity of said jet.

35. The guidance system of claim 34 wherein said pressure sensing means include a pressure sensor having means for sensing the pressure differential between the interior and exterior of said supply passage means.

36. The guidance system of claim 34 wherein said fluidic output signals from said rate sensor means have a relative pressure differential indicative of said rate and sense of rotation, said navigational guidance system further comprises means for converting said fluidic output signals to a duality of oscillating output signals having a relative frequency differential indicative of said relative pressure differential, and said pressure sensing means include a frequency summer having means for sensing said relative frequency differential.

37. The guidance system of claim 34 wherein said temperature sensing means include a semiconductor type temperature sensor in thermal communication with said rate sensor means.

38. Apparatus for use in preventing environmentally caused jet drift in a device, such as a fluidic rate sensor or the like, adapted to receive fluid and form a fluid jet therefrom, said apparatus comprising:

(a) means for sensing the temperature and pressure of the jet; and (b) means for varying the velocity of the jet in response to the sensed pressure and temperature to thereby maintain the Reynolds number of the jet within a predetermined range.

39. The apparatus of claim 38 wherein fluid is supplied to the device by a motor-driven pump, and said means for varying the velocity of the jet include means for varying the speed of the pump motor.

40. The apparatus of claim 38 further comprising calibration means for compensating for fabricational inaccuracies in the device.

41. For use in controlling the rotational attitude of a body relative to a predetermined control axis thereof, the body having associated therewith control means for returning it to a predetermined rotational attitude in response to a control signal indicating a rotational deviation of the body from the predetermined attitude thereof, an angular rate sensing system adapted to be mounted on the body and comprising:

(a) a fluidic angular rate sensor having jet-forming means for receiving fluid and discharging a fluid jet, and jet-receiving means for utilizing the jet to create a pair of fluidic output signals having a relative pressure differential indicative of the rate and sense of rotation of the body about the control axis;

(b) means for supplying fluid to said jet-forming means;

(c) means for sensing the pressure and temperature of said jet and transmitting a pair of output signals indicative of the sensed pressure and temperature;

(d) means for receiving said sensed pressure and temperature output signals and, in response thereto, for controlling the volumetric flow rate of fluid supplied by said means (b) to said jet-forming means to thereby maintain the Reynolds number of said jet within a predetermined range;

(e) means for converting said fluidic output signals from said rate sensor to a pair of oscillating signals having a relative frequency differential indicative of said rate and sense of rotation of the body about the control axis, said oscillating signals together defining a control signal; and (f) means for transmitting said control signal to the control means of the body.

42. The rate sensing system of claim 41 further comprising a thermally insulated, substantially airtight container within which said elements (a) through (e) are housed, said converting means (e) include fluid operable components, said fluid supplying means (b) include a pump having an inlet, and passage means for supplying fluid discharged from said pump to said fluid operable components, and wherein said rate sensor and said fluid operable components have means for venting fluid received thereby to the interior of said container, said pump inlet being adapted to receive the vented fluid.

43. A navigational guidance system for controlling the rotational attitude of a body relative to at least on control axis, said guidance system comprising:

(a) control means operable to exert a corrective force on the body to return it to a predetermined attitude relative to a control axis in response to receiving a corrective input signal indicating a deviation of the body from said predetermined attitude thereof;

(b) a fluidic angular rate sensor carried by the body for motion therewith and having:
 (1) passage means for receiving a fluid and discharging a fluid jet, and
 (2) means for utilizing said jet to create a pair of pressure output signals having a relative pressure differential indicative of the rate and sense of rotation of the body about said control axis, and
 (3) calibration means for rendering said relative pressure differential substantially zero, at zero rotational rate of the body about said control axis, despite fabricational inaccuracies in said rate sensor;

(c) means for converting said pressure output signals to a pair of oscillating signals having a relative frequency differential indicative of said rate and sense of rotation, whereby said oscillating signals together define an output signal from said converting means representing the actual rate of rotation of the body about said control axis;

(d) means for supplying fluid to said passage means of said rate sensor;

(e) means associated with said fluid supplying means for maintaining the Reynolds number of said jet within a predetermined range; and (f) comparator means for receiving said output signal from said converting means, comparing the same to a desired rate of rotation of the body about said control axis, and responsively transmitting a corrective input control signal to said control means to operate the same.

44. A three-axis navigational guidance system comprising:

(a) three fluidic angular rate sensors each having:
 (1) a control axis, (2) passage means for receiving fluid from a source thereof and discharging the received fluid in the form of a jet, (3) a pair of outlets, and (4) means responsive to rotation of the rate sensor about its control axis for utilizing the jet to create in the rate sensor outlets a pair of pressure output signals having a relative pressure differential indicative of the rate and sense of said rotation;

(b) means linking said rate sensors for conjoint movement and relatively positioning them so that their control axes are mutually perpendicular;

(c) means for flowing fluid into said passage means of each of said rate sensors;

(d) means for converting each said pair of pressure output signals to a pair of oscillating electrical signals having a relative frequency differential indicative of said relative pressure differential between such pressure output signals; and (e) means operatively associated with said fluid flowing means (c) for maintaining the Reynolds number of each of said jets within a predetermined range despite changes in the temperature or pressure of said jets.

45. The guidance system of claim 44 wherein said linking means (b) include a support member having three mutually perpendicular surfaces, and means mounting each of said rate sensors on a different one of said surfaces, and said fluid flowing means (c) include a pump having an outlet and passage means formed within said support member fluidically communicating said outlet of said pump with said passage means of said rate sensors.

46. The guidance system of claim 44 wherein said means (e) include means for varying the velocity of the jets in response to variations in their temperatures and pressures.

47. The guidance system of claim 46 wherein said fluid flowing means include a pump having an outlet communicating with said rate sensor inlets, and said means (e) comprise means for sensing the temperatures and pressures of said jets and means for varying the speed of said pump in response to the sensed temperatures and pressures.

48. The guidance system of claim 44 further comprising a container enveloping said elements (a) through (e), and wherein said converting means are fluid operable, said means (c) include a pump having an outlet, an inlet disposed within said container, and passage means communicating said pump outlet with said rate sensor inlets and said fluid operable converting means, and said rate sensors and said converting means have means for venting fluid supplied thereto to the interior of said container for return therethrough to said inlet of said pump.

49. A method of calibrating a fluidic angular rate sensor having: jet-forming passage means for receiving fluid, flowing the fluid along a flow axis, and discharging the fluid in the form of a jet having a jet axis; splitter means spaced from the passage means and positioned in the path of the jet for dividing it into two separate streams; and a pair of receiving passages each adapted to receive one of the streams and be pressurized thereby, said method comprising the steps of:

(a) flowing fluid through the jet-forming passage means to thereby create a pressure differential between the receiving passages due to fabricational inaccuracies in the rate sensor, said pressure differential monotonically increasing with increases in the Reynolds number of the jet;

(b) compensating for fabricational misalignment between the splitter means and the flow axis to thereby alter the relationship between said pressure differential and said Reynolds number so that said pressure differential nonmonotonically increases upon increases in said Reynolds number; and (c) precisely aligning the jet axis with the flow axis to thereby substantially eliminate said pressure differential within a range of Reynolds numbers of the jet.

50. The method of claim 49 further comprising the step of:

(d) environmentally stabilizing the jet by maintaining its Reynolds number within said range of Reynolds numbers.

51. The method of claim 50 wherein said jet-stablizing step is performed by maintaining a predetermined relationship among the temperature, pressure and velocity of the jet.

52. The method of claim 51 wherein said fluid flowing step (a) includes fluidically coupling the outlet of a pump to the jet-forming passage means, and said predetermined relationship is maintained by automatically varying the speed of the pump in response to variations in the temperature and pressure of the jet.

53. The method of claim 49 wherein said compensating step (b) is performed by adjustably bending the rate sensor to precisely align the splitter means with the flow axis.

54. The method of claim 49 wherein said compensating step (b) is performed by adjustably venting one of the receiving passages.

55. The method of claim 49 wherein said steps (b) and (c) are performed by adjustably bending the rate sensor to precisely mutually align the splitter means, the flow axis and the jet axis.

56. The method of constructing a fluidic angular rate sensor comprising the steps of:

(a) providing a main rate sensor lamina;

(b) forming in said main rate sensor lamina openings defining an interaction channel, a nozzle portion having a passage extending therethrough and opening forwardly into said interaction channel, said passage having a flow axis, means connecting said nozzle portion to an adjacent portion of said main rate sensor lamina in a manner permitting movement of said nozzle portion relative to said adjacent rate sensor lamina portion, a splitter portion spaced forwardly of said passage and having a rearwardly facing leading section generally aligned with said flow axis, and a pair of receiving channels opening rearwardly into said interaction channel and positioned on opposite sides of said splitter portion;

(c) providing a plurality of auxiliary laminae;

(d) stacking said main rate sensor lamina and said auxiliary laminae so that said main rate sensor lamina is positioned between a pair of said auxiliary laminae;

(e) intersecuring the stacked laminae to form a laminated body, said intersecuring being performed in a manner permitting movement of said nozzle portion within said body; and (f) providing means associated with said body for adjustably moving said nozzle portion within said body to thereby compensate for fabricational inaccuracies in said nozzle portion.

57. The method of claim 56 wherein said rate sensor body has a control axis generally perpendicular to said flow axis, and said providing step (f) includes providing means associated with said body for exerting a selectively variable force upon said nozzle portion in a direction generally perpendicular to said control axis and said flow axis.

58. The method of claim 56 wherein said rate sensor body has a control axis generally perpendicular to said flow axis and said method further comprises the step of:
- (g) providing means associated with said body for adjustably bending said body about an axis generally parallel to said control axis to precisely align said leading section of said splitter portion with said flow axis to thereby correct for fabricational misalignment therebetween.

59. The method of claim 56 further comprising the step of:
- (h) providing means associated with said body for adjustably venting one of said receiving channels to thereby compensate for fabricational misalignment between said flow axis and said leading section of said splitter portion.

60. The method of constructing a fluidic angular rate sensor comprising the steps of:
- (a) providing a main rate sensor lamina;
- (b) forming openings through said main rate sensor lamina to define therein:
  - (1) an interaction channel,
  - (2) a nozzle portion having a rear section and a pair of opposite wall members positioned forwardly of said rear section on opposite sides of a nozzle passage opening forwardly into said interaction channel and having a flow axis, and
  - (3) support sections connecting said nozzle portion to the remainder of said main rate sensor lamina in a manner permitting movement of said rear nozzle portion relative to said remainder and causing, in response to said movement, a relative movement between said opposite wall members in a direction generally parallel to said flow axis;
- (c) providing first and second pluralities of auxiliary laminae;
- (d) stacking said main and auxiliary laminae so that said main lamina is positioned between said first and second pluralities of auxiliary laminae;
- (e) intersecuring the stacked laminae to form a laminated rate sensor body, said intersecuring being performed in a manner permitting said movements of said rear nozzle portion section and said opposite wall members relative to said rate sensor body; and
- (f) providing means associated with said rate sensor body for exerting a selectively variable force upon said rear nozzle portion section to thereby cause a selectively variable degree of relative movement between said oppostie wall members of said nozzle portion.

61. The method of claim 60 further comprising the step of forming in at least one auxiliary lamina of each of said first and second pluralities of auxiliary laminae an adjustment portion movable relative to the remainder thereof, and wherein said stacking step includes positioning said auxiliary laminae adjustment portions and said rear nozzle portion section to collectively define an adjustment substructure within said rate sensor body, said intersecuring step includes bonding together the adjacent pairs of stacked laminae and applying a bonding agent inhibitor to oppositely facing surfaces of said adjustment substructure, said support sections and said opposite wall members, and said providing step (f) includes providing means associated with said body for exerting a selectively variable force upon said adjustment substructure in a direction generally perpendicular to said flow axis.

62. The method of claim 60 wherein said forming step further includes forming openings through said main rate sensor lamina to define therein a splitter portion spaced forwardly of said nozzle passage and having a rearwardly facing leading section generally aligned with said flow axis, and a pair of receiving channels opening rearwardly into said interaction channel and positioned on opposite sides of said splitter portion, and said method further comprises the steps of providing means associated with said body for adjustably venting one of said receiving channels to compensate for fabricational misalignment between said flow axis and said leading splitter portion section.

63. The method of claim 60 wherein said forming step further includes forming openings through said main rate sensor lamina to define therein a splitter portion spaced forwardly of said nozzle passage and having a rearwardly facing leading section generally aligned with said flow axis, and a pair of receiving channels opening rearwardly into said interaction channel and positioned on opposite sides of said splitter portion, and said method further comprises the step of:
- (g) providing means associated with said body for adjustably bending said body about an axis generally perpendicular to said flow axis to precisely align said leading splitter portion section with said flow axis to thereby correct for fabricational misalignment therebetween.

64. The method of claim 63 further comprising the step of:
- (h) forming through each of said auxiliary laminae and said main rate sensor lamina a pair of calibration channels positioned to divide said rate sensor body into a forward section, a rear section and a relatively small joining section interconnecting said forward and rear body sections, and said step (g) is performed by providing means associated with said body for adjustably pivoting one of said body sections relative to the other of said body sections about said joining section.

65. The method of claim 56 or 60 wherein said forming step includes forming at least a portion of said openings by an electric discharge machining process.

66. The method of claim 56 or 60 wherein said providing step (a) and said forming step (b) are performed by providing a plurality of main rate sensor sublaminae, chemically etching at least one opening in each of said sublaminae, intersecuring said sublaminae to form said main lamina, and forming at least one opening in said main lamina by an electric discharge machining process.

67. A method of maintaining a moving body in a desired rotational attitude relative to a control axis of the body, said method comprising the steps of:
- (a) providing a fluidic angular rate sensor having:
  - (1) a splitter member having a leading edge,
  - (2) a discharge passage spaced from said leading edge and having a flow axis generally aligned therewith, and
  - (3) a pair of receiving passages positioned on opposite sides of said splitter member;
- (b) flowing fluid through said discharge passage to create a fluid jet which exits therefrom, flows along a jet axis, impinges upon said leading edge and is divided thereby into a duality of streams each of which flows into and pressurizes a different one of said receiving passages;

(c) associating said rate sensor with the body for motion therewith so that rotation of the body about the control axis causes a deflection of said jet relative to said leading edge toward one of said receiving passage to thereby increase the pressure therein and decrease the pressure in the other of said receiving passages;

(d) substantially equalizing the pressures in said receiving passages at zero rotational rate of the body about the control axis despite fabricational inaccuracies in said rate sensor causing undesired misalignments among said leading edge, said jet axis and said flow axis;

(e) limiting appreciable deflection of said jet relative to said leading edge to that caused by rotation of the body; and (f) providing means for utilizing rotationally induced pressure differentials between said receiving passages to return the body to said desired rotational attitude thereof, said pressure equalizing step including the step of adjustably bending said rate sensor.

68. A method of navigationally guiding a moving body comprising the steps of:

(a) providing jet-forming means for receiving fluid from a source thereof and discharging a fluid jet;

(b) associating said jet-forming means with the body for motion therewith;

(c) supplying fluid to said jet-forming means;

(d) utilizing said jet to create a duality of output signals collectively indicative of the rate and sense of rotation of the body about a control axis;

(e) utilizing said output signals to return the body to a predetermined attitude relative to said control axis; and (f) maintaining the Reynolds number of said jet within a predetermined range despite variation in the temperature or pressure of said jet.

69. The method of claim 68 wherein said maintaining step is performed by varying the velocity of said jet in response to variations in the pressure or temperature thereof.

70. The method of claim 69 wherein said fluid supplying step includes the step of fluidically coupling a pump to said jet-forming means, and said maintaining step includes the step of varying the speed of said pump in response to variations in the temperature or pressure of said jet.

71. A fluidic angular rate sensor constructed by a method comprising the steps of:

(a) providing a main rate sensor lamina;

(b) forming in said main rate sensor lamina openings defining an interaction channel, a nozzle portion having a passage extending therethrough and opening forwardly into said interaction channel, said passage having a flow axis, means connecting said nozzle portion to an adjacent portion of said main rate sensor lamina in a manner permitting movement of said nozzle portion relative to said adjacent rate sensor lamina portion, a splitter portion spaced forwardly of said passage and having a rearwardly facing leading section generally aligned with said flow axis, and a pair of receiving channels opening rearwardly into said interaction channel and positioned on opposite sides of said splitter portion;

(c) providing a plurality of auxiliary laminae;

(d) stacking said main rate sensor lamina and said auxiliary laminae so that said main rate sensor lamina is positioned between a pair of said auxiliary laminae;

(e) intersecuring the stacked laminae to form a laminated body, said intersecuring being performed in a manner permitting movement of said nozzle portion within said body; and (f) providing means associated with said body for adjustably moving said nozzle portion within said body to thereby compensate for fabricational inaccuracies in said nozzle portion.

72. A fluidic angular rate sensor according to claim 71 wherein said rate sensor body has a control axis generally perpendicular to said flow axis, and said providing step (f) includes providing means associated with said body for exerting a selectively variable force upon said nozzle portion in a direction generally perpendicular to said control axis and said flow axis.

73. A fluidic angular rate sensor according to claim 71 wherein said rate sensor body has a control axis generally perpendicular to said flow axis and said method further comprises the step of:

(g) providing means associated with said body for adjustably bending said body about an axis generally parallel to said control axis to precisely align said leading section of said splitter portion with said flow axis to thereby correct for fabricational misalignment therebetween.

74. A fluidic angular rate sensor according to claim 71 wherein said method further comprises the step of:

(g) providing means associated with said body for adjustably venting one of said receiving channels to thereby compensate for fabricational misalignment between said flow axis and said leading section of said splitter portion.

75. A fluidic angular rate sensor constructed by a method comprising the steps of:

(a) providing a main rate sensor lamina;

(b) forming openings through said main rate sensor lamina to define therein:

(1) an interaction channel, (2) a nozzle portion having a rear section and a pair of opposite wall members positioned forwardly of said rear section on opposite sides of a nozzle passage opening forwardly into said interaction channel and having a flow axis, and (3) support sections connecting said nozzle portion to the remainder of said main rate sensor lamina in a manner permitting movement of said rear nozzle portion relative to said remainder and causing, in response to said movement, a relative movement between said opposite wall members in a direction generally parallel to said flow axis;

(c) providing first and second pluralities of auxiliary laminae;

(d) stacking said main and auxiliary laminae so that said main lamina is positioned between first and second pluralities of auxiliary laminae;

(e) intersecuring the stacked laminae to form a laminated rate sensor body, said intersecuring being performed in a manner permitting said movements of said rear nozzle portion section and said opposite wall members relative to said rate sensor body; and (f) providing means associated with said rate sensor body for exerting a selectively variable force upon said rear nozzle portion section to thereby cause a selectively variable degree of relative movement between said opposite wall members of said nozzle portion.

76. A fluidic angular rate sensor according to claim 75 wherein said method further comprises the step of forming in at least one auxiliary lamina of each of said first and second pluralities of auxiliary laminae an adjustment portion movable relative to the remainder thereof, and wherein said stacking step includes positioning said auxiliary laminae adjustment portions and said rear nozzle portion section to collectively define an adjustment substructure within said rate sensor body, said intersecuring step includes bonding together the adjacent pairs of stacked laminae and applying a bonding agent inhibitor to oppositely facing surfaces of said adjustment substructure, said support sections and said opposite wall members, and said providing step (f) includes providing means associated with said body for exerting a selectively variable force upon said adjustment substructure in a direction generally perpendicular to said flow axis.

77. A fluidic angular rate sensor according to claim 75 wherein said forming step further includes forming openings through said main rate sensor lamina to define therein a splitter portion spaced forwardly of said nozzle passage and having a rearwardly facing leading section generally aligned with said flow axis, and a pair of receiving channels opening rearwardly into said interaction channel and positioned on opposite sides of said splitter portion, and said method further comprises the step of:

(g) providing means associated with said body for adjustably bending said body about an axis generally perpendicular to said flow axis to precisely align said leading splitter portion section with said flow axis to thereby correct for fabricational misalignment therebetween.

78. A fluidic angular rate sensor according to claim 75 wherein said forming step further includes forming openings through said main rate sensor lamina to define therein a splitter portion spaced forwardly of said nozzle passage and having a rearwardly facing leading section generally aligned with said flow axis, and a pair of receiving channels opening rearwardly into said interaction channel and positioned on opposite sides of said splitter portion, and said method further comprises the step of providing means associated with said body for adjustably venting one of said receiving channels to compensate for fabricational misalignment between said flow axis and said leading splitter portion section.

79. A fluidic angular rate sensor according to claim 77 further comprising the step of:

(h) forming through each of said auxiliary laminae and said main rate sensor lamina a pair of calibration channels positioned to divide said rate sensor body into a forward section, a rear section and a relatively small joining section interconnecting said forward and rear body sections, and said step (g) is performed by providing means associated with said body for adjustably pivoting one of said body sections relative to the other of said body sections about said joining section.

80. A fluidic angular rate sensor according to claim 71 or 75 wherein said forming step includes forming at least a portion of said openings by an electric discharge machining process.

* * * * *